(12) United States Patent
Khan et al.

(10) Patent No.: US 12,082,117 B2
(45) Date of Patent: Sep. 3, 2024

(54) BATTERY LIFE-TIME PREDICTION FOR LOW POWER DEVICES

(71) Applicant: TELEFONAKTIEBOLAGET LM ERICSSON (PUBL), Stockholm (SE)

(72) Inventors: Talha Khan, Santa Clara, CA (US); Per Gunningberg, Uppsala (SE); Olof Liberg, Enskede (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 203 days.

(21) Appl. No.: 17/612,531

(22) PCT Filed: May 21, 2019

(86) PCT No.: PCT/IB2019/054202
§ 371 (c)(1),
(2) Date: Nov. 18, 2021

(87) PCT Pub. No.: WO2020/234628
PCT Pub. Date: Nov. 26, 2020

(65) Prior Publication Data
US 2022/0303906 A1     Sep. 22, 2022

(51) Int. Cl.
*H04W 52/02*     (2009.01)
(52) U.S. Cl.
CPC ... *H04W 52/0258* (2013.01); *H04W 52/0225* (2013.01); *H04W 52/0277* (2013.01)
(58) Field of Classification Search
CPC ......... H04W 52/0258; H04W 52/0225; H04W 52/0277
USPC ..... 455/574, 343.1–343.6, 435.1–435.2, 464
See application file for complete search history.

(56) References Cited

U.S. PATENT DOCUMENTS

| 6,157,169 | A | * | 12/2000 | Lee .................. G01R 19/16542 320/132 |
| 10,448,327 | B2 | | 10/2019 | Fuleshwar Prasad et al. |
| 2004/0113590 | A1 | * | 6/2004 | Rosenquist .......... G01R 31/389 320/132 |

(Continued)

FOREIGN PATENT DOCUMENTS

| CN | 103119850 A | 4/2016 |
| EP | 2915021 A | 9/2015 |

(Continued)

OTHER PUBLICATIONS

Feeney, L. M., et al. "How do the dynamics of battery discharge affect sensor lifetime?." Wireless On-demand Network Systems and Services (WONS), 2014 11th Annual Conference on. IEEE, 2014.

(Continued)

*Primary Examiner* — Michael Y Mapa

(57) ABSTRACT

A network node is configured to monitor battery usage on behalf of the low power device and to predict the SOC and remaining life-time for the batteries in the low power devices. The network nodes are fully powered and have the computational capacity to use more complex and accurate models that are not feasible for implementation in resource-limited devices. The network node can calculate the SOC and remaining life-time for a low power device and may also change the transmission and reception patterns for the device to extend the life-time of the battery.

14 Claims, 24 Drawing Sheets

(56) References Cited

U.S. PATENT DOCUMENTS

| | | |
|---|---|---|
| 2007/0091836 A1 | 4/2007 | Oprescu-Surcobe et al. |
| 2007/0248031 A1 | 10/2007 | Kitahara et al. |
| 2010/0323753 A1 | 12/2010 | Imamura et al. |
| 2011/0111799 A1 | 5/2011 | Kothari et al. |
| 2014/0330764 A1 | 11/2014 | Rhines et al. |
| 2018/0279221 A1 | 9/2018 | Fuleshwar Prasad et al. |

FOREIGN PATENT DOCUMENTS

| | | | |
|---|---|---|---|
| EP | 3340694 A1 | 6/2020 | |
| EP | 3355627 B1 | 8/2020 | |
| WO | 2014066678 A1 | 5/2014 | |
| WO | WO-2014066678 A2 * | 5/2014 | ........... G06F 1/3212 |

OTHER PUBLICATIONS

Kim, T., et al., "A hybrid battery model capable of capturing dynamic circuit characteristics and nonlinear capacity effects", in IEEE Transactions on Energy Conversion, vol. 26, 2011.

Rao R., et a., "Battery modeling for energy aware system design", in Computer, vol. 36, No. 12, pp. 77-87, Dec. 2003.

Rohner, C., et al., "Evaluating battery models in wireless sensor networks", In 11th Int'l Conf. on Wired/Wireless Internet Communications (WWIC), 2013.

* cited by examiner

BATTERY LIFE-TIME PREDICTION FOR LOW POWER DEVICES

PRIORITY CLAIM

This application is a national stage of International Application No. PCT/IB2019/054202, filed May 21, 2019, the entire disclosure of which is fully incorporated by reference herein for all purposes.

CROSS-REFERENCE TO RELATED APPLICATIONS

Cross-reference is made to co-pending application entitled "BATTERY LIFE-TIME OPTIMIZATION FOR LOW POWER DEVICES" (U.S. patent application Ser. No. 17/612,524), filed on the same date as the present application and commonly owned.

TECHNICAL FIELD

The present disclosure relates generally to battery management for low power devices and, more particularly, to battery life-time prediction for low power devices.

BACKGROUND

In Release 13 of the Long Term Evolution (LTE) standard, The Third Generation Partnership Project (3GPP) standardized two approaches for machine-type communication (MTC) known as LTE-MTC (LTE-M) and Narrowband Internet of Things (NB-IoT). These new radio access technologies were designed to provide improved indoor coverage, support for massive numbers of low throughput devices (i.e., high capacity), low delay sensitivity, ultralow device cost, low device power consumption, and optimized network architecture.

Future MTC or IoT devices, referred to herein as low power devices, are expected to be of low cost and complexity, and to operate for many years without maintenance or change of batteries. Low power devices typically have small, inexpensive batteries with limited capacity, i.e., amount of energy. For devices that will operate for up to 10 years, it is therefore important to optimize battery usage using techniques such as power saving mode (PSM), discontinuous reception (DRX), and transmit power control (TPC). It can also be important to predict the life-time of the battery based on the usage patterns of the lower power device.

The conventional method to predict the remaining battery life-time of a battery is to implement a battery usage model on the low power device, as is done today for smart phones and electric vehicles. The battery usage patterns are fed into the battery model to calculate the remaining State-Of-Charge (SOC) of the battery. After the SOC is estimated the remaining life-time is calculated, given an assumed future behavior of the device.

The traditional methods to predict battery life-times are based on the average current used. These traditional methods for modeling and predicting battery life-time fall short in terms of accuracy and are too complex to be implemented on low power devices with limited capacity. The simple linear, average life-time models, for example, do not include rate current and charge recovery effects. The average life-time calculations can be off as much as 300% from actual battery life-time.

SUMMARY

The present disclosure provides improved methods and apparatus for predicting the life-time of a battery in a lower power device, such as an MTC device or IoT device. In most mobile communication networks, the base station has full information about and controls all receive and transmit periods of the low power devices. Thus, the base station is well positioned to monitor battery usage on behalf of the low power device and to predict the SOC and remaining life-time for the batteries in the low power devices. The base stations are fully powered and have the computational capacity to use more complex and accurate models that are not feasible for implementation in resource-limited devices. The base station or other network node can calculate the SOC and remaining life-time for a low power device and may also change the transmission and reception patterns for the device to improve the life-time of the battery.

One aspect of the disclosure comprises methods performed by a network node in a wireless communication network of monitoring the state of a battery in a low power UE served by the network node. The network node determines a voltage response characteristic of a battery used by a UE and generates a predictive model for predicting a state of the battery based on the voltage response characteristic of the battery. The network node further determines an activity pattern of the UE and estimates a predicted life-time of the battery based on the predictive model and the activity pattern of the UE.

Another aspect of the disclosure comprises a network node configured to perform battery state monitoring for low power UEs served by the network node. The network node comprises interface circuitry for communication with the UE over a wireless communication channel and processing circuitry operatively coupled to the interface circuit and configured to predict a remaining life-time of the battery in the UE. The processing circuitry determines a voltage response characteristic of a battery used by the UE and generates a predictive model for predicting a state of the battery based on the voltage response characteristic of the battery. The processing circuitry further determines an activity pattern of the UE and estimates a predicted life-time of the battery based on the predictive model and the activity pattern of the UE Another aspect of the disclosure comprises computer programs for configuring a network node as herein described. The computer program comprises instructions that, when executed on at least one processor of the network node, causes the network node to carry out any of the respective processing described above. The computer program can be embodied in a carrier such as an electronic signal, optical signal, or radio signal. The computer program can also be embodied in a non-transitory computer-readable (storage or recording) medium.

Another aspect of the disclosure comprises a method implemented by a UE to support battery-aware communication procedures. In one embodiment of the method, the UE transmits information to a network node indicative of a voltage response characteristic of a battery used by the UE and receives information from the network node determined based on the voltage response characteristic of the battery. The UE further performs, based on the information received from the network node, a communication procedure for communicating with the network node to extend a useful life-time of the battery.

Another aspect of the disclosure comprises a UE to support battery-aware communication procedures. In one embodiment, the UE comprises an interface circuit and a processing circuit operatively coupled to the interface circuit. The interface circuit is configured to communicate with a network node over a wireless communication channel. The processing circuit is configured to transmit information to the network node indicative of a voltage response characteristic of a battery used by the UE, and to receive information from the network node determined based on the voltage response characteristic of the battery. The processing circuit is further configured to perform, based on the information received from the network node, a communication procedure for communicating with the network node to extend a useful life-time of the battery.

Another aspect of the disclosure comprises computer programs for configuring a UE as herein described. The computer program comprises instructions which, when executed on at least one processor of the UE, cause the UE to carry out any of the respective processing described above. The computer program can also be embodied in a carrier such as an electronic signal, optical signal, or radio signal. The computer program can also be embodied in a non-transitory computer-readable (storage or recording) medium.

DETAILED DESCRIPTION

The present disclosure describes methods and apparatus for battery monitoring for low power devices in wireless communication networks, which are also referred to as cellular networks. For purposes of illustration, the principles and techniques applied in the present disclosure will be described in the context of an LTE-M network or NB-IoT network. Those skilled in the art will appreciate that the teachings are also applicable to networks operating according to other standards including conventional LTE network and Fifth Generation (5G) networks. Therefore, the scope of the claims is not limited by the specific examples described herein, which are provided solely for the purpose of illustration.

Figure 1:
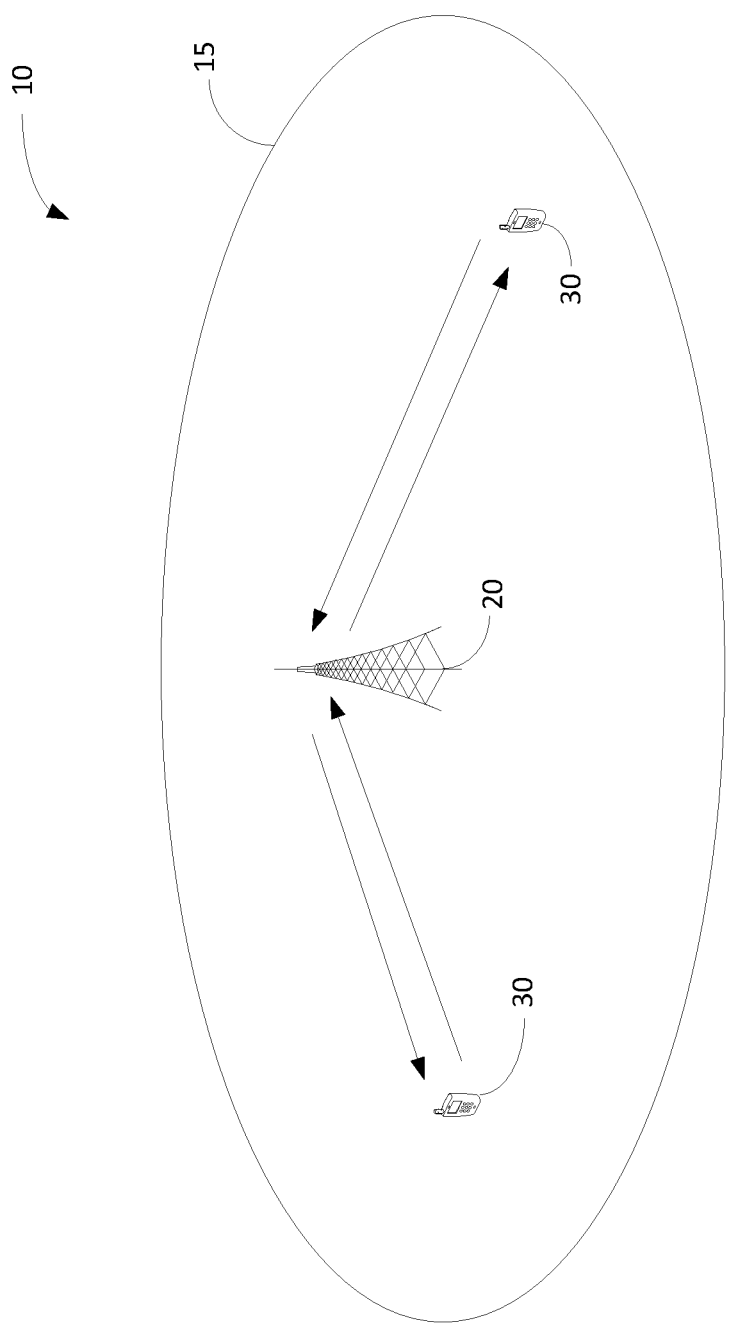
FIG. 1 illustrates an exemplary wireless communication network in which the battery state monitoring techniques are used.

FIG. 1 illustrates an exemplary wireless communication network 10 in which the battery monitoring techniques herein described can be used to extend the useful life of batteries in low power devices. The wireless communication network 10 comprises one or more base stations 20 providing service to UEs 30 in respective cells 15 of the wireless communication network 10. The base stations 20 are also referred to as Evolved NodesBs (eNBs) and gNodeBs (gNBs) in 3GPP standards. Although only one cell 15 and one base station 20 are shown in FIG. 1, those skilled in the art will appreciate that a typical wireless communication network 10 comprises many cells 15 served by many base stations 20.

The UEs 30 may comprise any type of devices capable of communicating with the base stations 20 over a wireless communication channel. For example, the UEs 30 may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 10.

In LTE-M and NB-IoT networks, a low power UE 30 is typically powered by a small battery with limited-capacity. The desired life-time of the UE 30 could be longer than 10 years so power consumption is an important consideration in the design and operation of the UE 30. The life-time of a limited-capacity battery, which is often measured in terms of milliampere hours (mA-h), depends on the activity pattern of the UE 30. For example, for the same average load, the battery in a UE 30 operated in a bursty (duty-cycled) manner may outlive the battery in a UE 30 which continuously supplies current. The following parameters play a role in determining the battery life-time:

Active period (the duration for which the battery supplies current)

Recovery period (the resting period during which the battery recovers)

Sustained current (the current supplied during active mode)

Nominal battery rating (mA-h, volts)

State-of-charge (consumed capacity)

Figure 2:
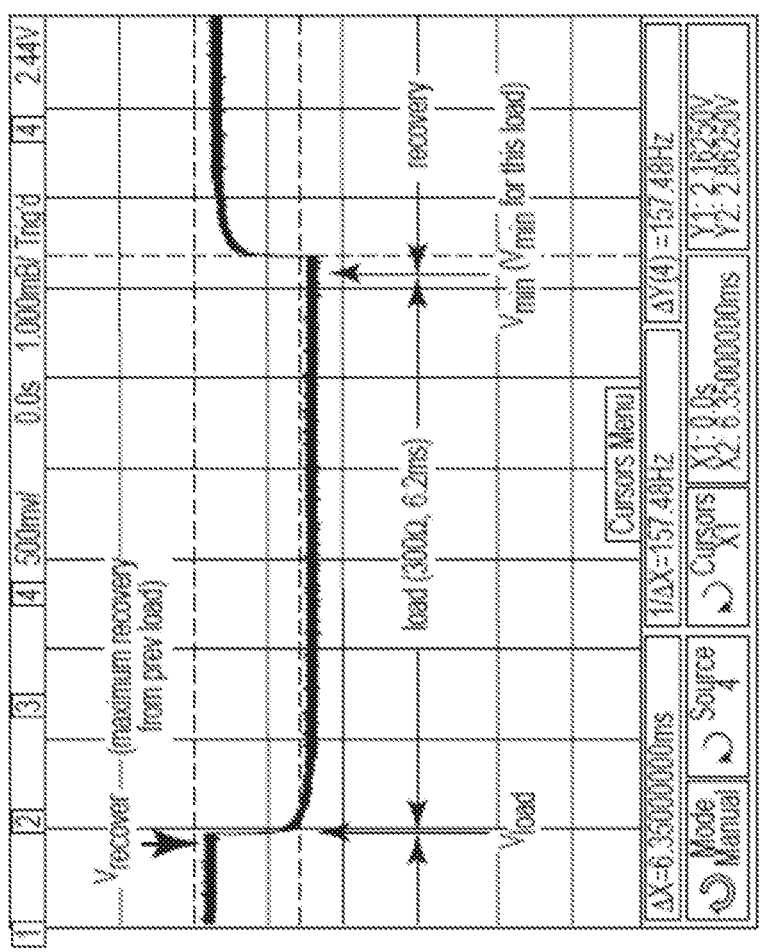
FIG. 2 is a graph illustrating the voltage response of a battery to a load.

FIG. 2 illustrates the output voltage of a coin cell battery in response to a load. When the load is applied, the battery voltage initially drops to $V_{load}$ and continues to drop to $V_{min}$ for the duration of the load. When the load is removed, the battery partially recovers its output voltage, where the magnitude of recovery depends on the recovery period. For example, with a sufficiently long recovery period, the battery voltage may recover to $V_{recover}$.

Figure 3:
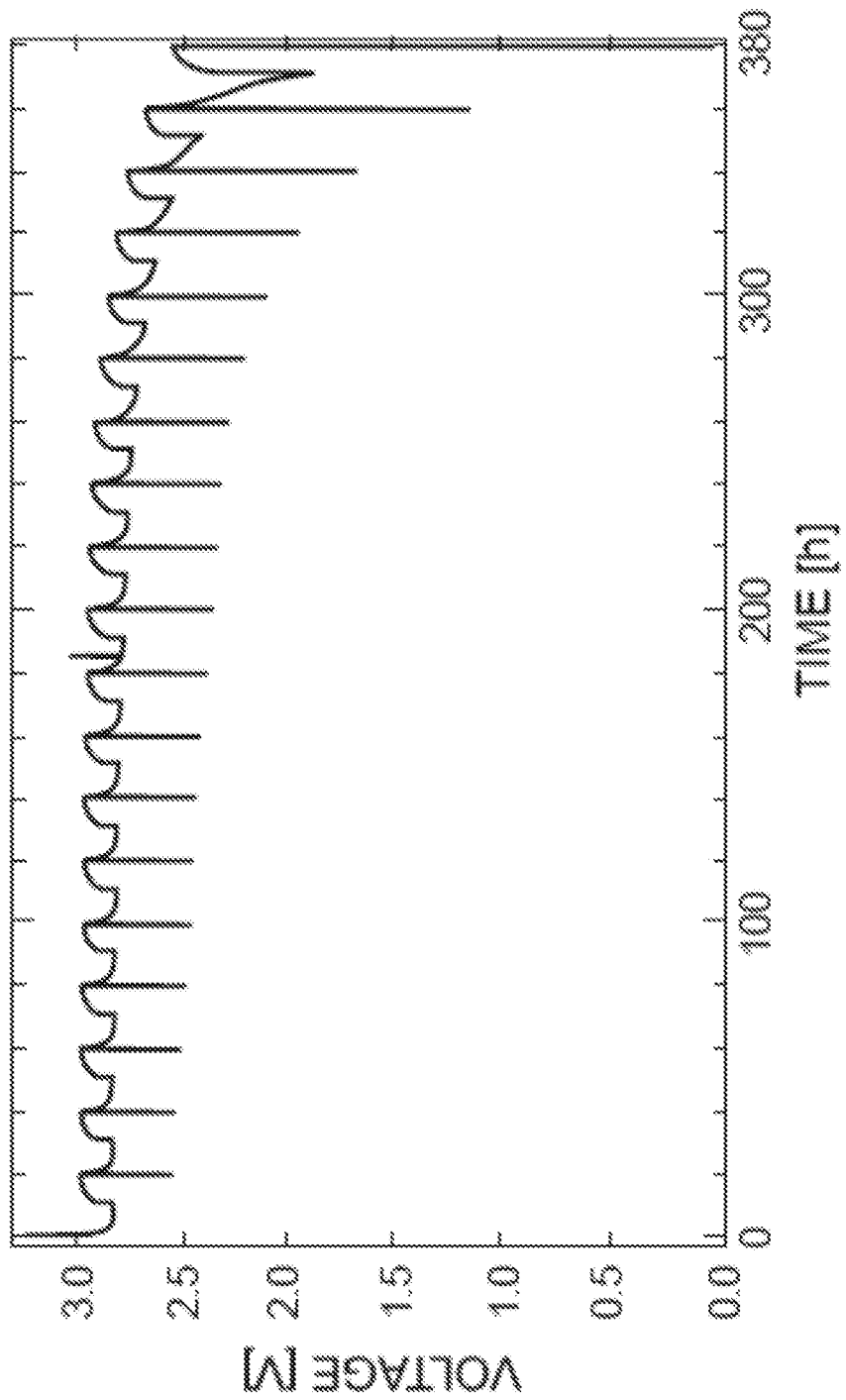
FIG. 3 is a graph illustrating the voltage response of a battery to a sequence of a periodic load.

The nominal and consumed capacity or state-of-charge (SOC) of the battery also impacts the battery life because the voltages $V_{load}$ and $V_{recover}$ tend to deteriorate with use. When the load voltage drops below a cut-off voltage (e.g., 2 V), the battery can no longer operate the UE 30. This trend is illustrated in FIG. 3, which depicts the voltage response of a coin cell battery in response to a periodic load. Therefore, the activity pattern contains useful information about battery characteristics.

Because long battery life is a desirable feature in battery-powered UEs 30, many communication protocols aim to reduce power and extend the battery life-times of UEs 30 by simply reducing the active time of a UE 30. One power saving technique used in LTE-M and NB-IoT networks is discontinuous reception (DRX) and/or extended discontinuous reception (eDRX). This technique allows a UE 30 in idle mode to save energy by going to sleep and waking periodically to check for incoming paging messages.

Figure 4:
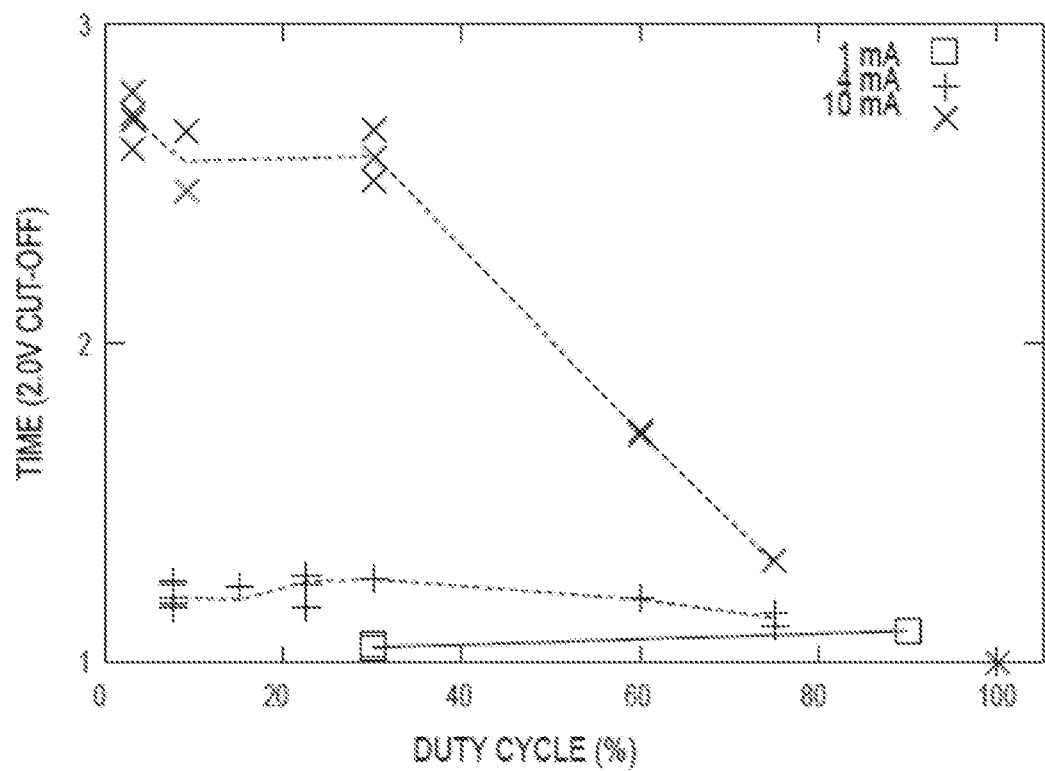
FIG. 4 illustrates the battery life-time as a function of duty cycle duration for various loads.

FIG. 4 illustrates the results of a simulation showing how the intensity and duration of activity impact the battery life-time for a given cut-off voltage. FIG. 4 shows that low duty-cycle loads with high current fare better in terms of battery life-time compared to high duty-cycle loads with low current. The present disclosure builds on these observations and attempts to extend the battery life-time of low power UEs by, for example, using battery-related information during UE scheduling and resource allocation.

Figure 5:
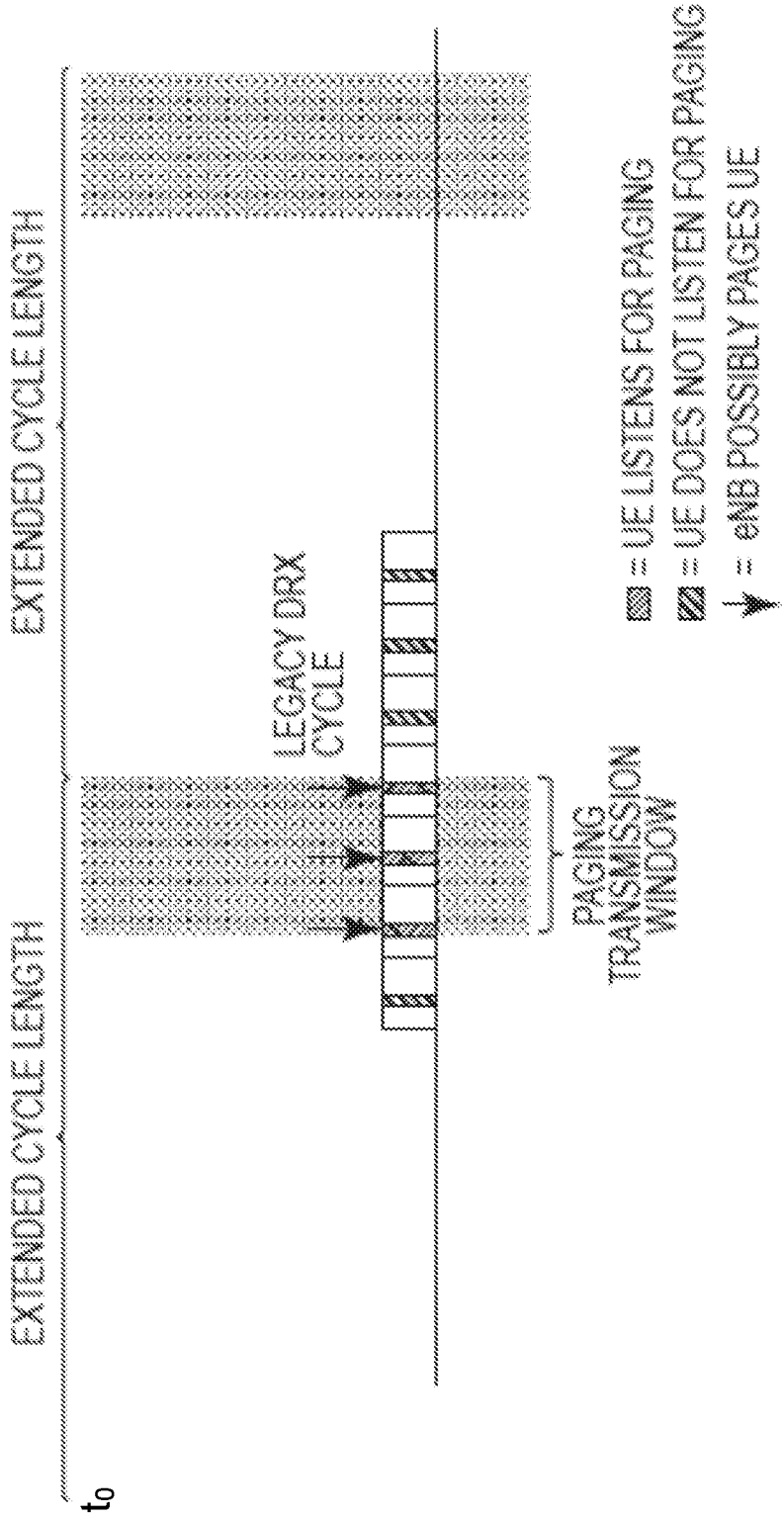
FIG. 5 illustrates one implementation of a DRX mode in a UE.

FIG. 5 illustrates an eDRX mode for a UE 30. The network configures the periodicity of the eDRX cycle, which could be up to around three hours for NB-IoT and up to 44 minutes for LTE-M. When a UE 30 wakes up at the end of an eDRX period, a paging transmission window starts during which a DRX mode is activated. During the paging window, the UE 30 monitors certain preconfigured paging occasions and sleeps between the preconfigured paging occasions, which further helps the UE 30 save energy. The sleep period between the paging occasions are shorter than the extended sleep period in an eDRX cycle. At the end of the paging transmission window, the next eDRX period starts and the UE 30 returns to the extended sleep mode.

Figure 6:
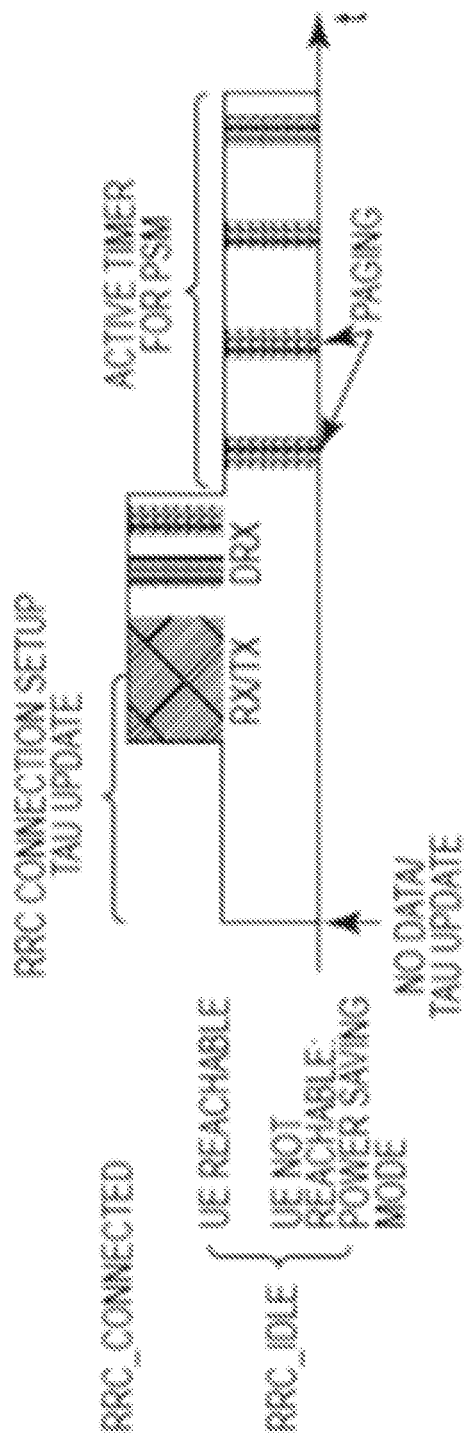
FIG. 6 illustrates one implementation of a power saving mode in a UE.

NB-IoT also supports a power saving mode (PSM) that allows the UE 30 to remain inactive for extended periods (up to more than a year). FIG. 6 illustrates an exemplary PSM for NB-IoT. During PSM, a UE 30 switches off most of its circuitry and only maintains a timer to keep track of the sleep duration and scheduled events. The UE 30 may wake up to access the network when an uplink data transmission is required. One example of an uplink transmission is a tracking area update (TAU). Once a UE 30 is active for a TAU, it periodically monitors the paging channel for a preconfigured duration before going to deep sleep.

Transmit power control (TPC) is a technique for reducing interference in the wireless communication system, but also helps to reduce power consumption in a UE 30. NB-IoT networks support open-loop power control to adjust the uplink transmit power of the UE 30. A UE 30 in poor coverage may be required to transmit with maximum power in order to meet minimum signal quality standards. A UE 30 in better coverage may transmit with a lower power, which reduces the power consumption as well as the interference level in the network.

Power control can be applied to uplink transmission on the Narrowband Physical Uplink Shared Channel (NPUSCH) in NB-IoT networks. If the number of repetitions exceeds two, the UE 30 transmits with maximum configured UE 30 power, $P_{max}$, which is set by the base station 20. If the number of repetitions is 1 or 2, the UE 30 transmit power is given by:

$$P_{NPUSCH} = \min\{P_{max}, 10 \log M + P_{target} + \alpha L\} (\text{dBm}) \quad \text{Eq. (1)}$$

where $P_{target}$ is the target received power at the base station 20, L is the estimated path loss, $\alpha$ is the path loss adjustment factor, M is a parameter related to the bandwidth of the NPUSCH waveform, which relates the target received power level to the target received Signal-to-Noise Ratio (SNR).

TPC can also be used for the Narrowband Physical Random Access Channel (NPRACH). Similar to NPUSCH, the UE 30 transmits with the maximum transmit power unless it is using the lowest repetition level where the transmit power is given by:

$$P_{NPRACH} = \min\{P_{max}, P_{target} + L\} (\text{dBm}) \quad \text{Eq. (2)}$$

As noted above, the transmit power setting of a UE 30 depends on the number of repetitions, which is determined by the base station 20 based on power headroom reports (PHRs) from the UE 30. In NB-IoT, the PHR is a mechanism that allows the UE 30 to send information about its transmit power budget to the eNB. The PHR measures the difference between $P_{max}$ (defined above) and the estimated UE 30 transmit power for the scheduled Msg-3 transmission. Depending on this difference, the UE 30 selects from a table of predefined PHR regimes and signals this information to the base station 20. The base station 20 uses this information to determine the number of repetitions to assign to the UE 30.

As will be described in greater detail below, the transport block size (TBS) for an uplink transmission can be selected or tailored in a way that extends the life-time of the battery in a UE 30. In Rel. 13, the TBS for NPUSCH format 1 (data) varies from 16 bits to 1000 bits (see Table 1 below). By varying this parameter, it is possible to shorten or prolong the UE 30 transmission time.

TABLE 1

Transport Block Size (TBS)

| $I_{TBS}$ | $I_{RU}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1000 |
| 7 | 104 | 224 | 328 | 472 | 584 | 712 | 1000 | 1224 |
| 8 | 120 | 256 | 392 | 536 | 680 | 808 | 1096 | 1384 |
| 9 | 136 | 296 | 456 | 616 | 776 | 936 | 1256 | 1544 |
| 10 | 144 | 328 | 504 | 680 | 872 | 1000 | 1384 | 1736 |
| 11 | 176 | 376 | 584 | 776 | 1000 | 1192 | 1608 | 2024 |
| 12 | 208 | 440 | 680 | 1000 | 1128 | 1352 | 1800 | 2280 |
| 13 | 224 | 488 | 744 | 1032 | 1256 | 1544 | 2024 | 2536 |

Each TBS can be mapped to 1, 2, 3, 4, 5, 6, 8, or 10 resource units (RUs). Each RU is 1 ms for NPUSCH configured with 12-subcarriers, or 2 ms, 4 ms, and 8 ms for NPUSCH configured with 6, 3, and 1 15-kHz subcarriers, respectively. For single-tone NPUSCH with 3.75 kHz subcarrier, one RU is 32 ms.

Each TBS can be repeated 1, 2, 4, 8, 16, 32, 64, or 128 times. Thus, the continuous transmission time can be as short as 1 ms and as long as 40.96 seconds. For NPUSCH transmissions longer than 256 ms, 3GPP requires that a gap of 40 ms be inserted to allow the UE 30 to switch to the DL channels to calibrate its time and frequency accuracy.

Figure 7:
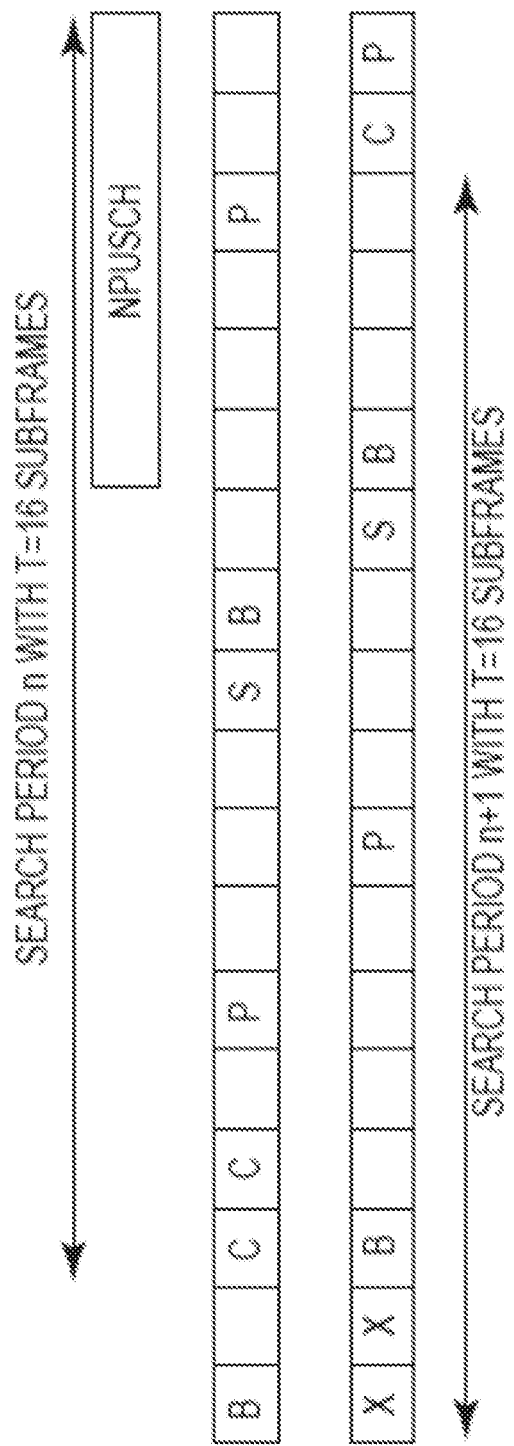
FIG. 7 illustrates an exemplary search space that is searched by a UE for control information.

Power savings can also be achieved by controlling connected mode operation of the UE 30. When the UE 30 is in connected mode, the base station 20 sends downlink control information (DCI) on the Narrowband Physical Downlink Control Channel (NPDCCH) to schedule transmissions to or from the UE 30. The NPDCCH is transmitted in one or more subframes that the UE 30 periodically monitors. The set of monitored subframes is called a search space. Within a search space, the UE 30 monitors the subframes carrying DCI which includes control information about Hybrid Automatic Repeat Request (HARQ) retransmissions, radio resource assignments, and scheduling. It is possible to control the duration of the search space and influence how frequently the UE 30 needs to scan for control information. For example, the key parameters for a NPDCCH search space for Type-2 Common Search Space (CSS) and UE-specific Search Space (USS) include:

$R_{max}$—the maximum repetition factor of NPDCCH
$\alpha_{offset}$—offset of the starting subframe in a search space
G—Parameter controlling the search space period
T—Search space period where $T=GR_{max}$ Using the DCI, base station 20 can schedule the UE 30 for future uplink transmissions including HARQ retransmissions. In FIG. 7, a search space with period $T=GR_{max}=8\times 2=16$ subframes is shown. Within the search space, the UE 30 scans the subframes "C" for the NPDCCH. A UE 30 monitors $R_{max}$ subframes within each search space. There is a scheduling delay to allow for transition from downlink reception to uplink transmission mode. The illustration in FIG. 7 shows a scheduling gap of 8 ms. Similarly, there is a 3 ms delay to allow the UE 30 to switch to reception mode after an uplink transmission on the Narrowband Physical Uplink Shared Channel (NPUSCH). For this reason, in the illustrated example, the UE 30 will not scan the second search space for DCI (marked by "X"). Therefore, the eNB will not use the second search space for sending DCI.

For completeness the illustration in FIG. 7 depicts mandatory periodic transmissions of the Narrowband Primary Synchronization Signal (NPSS) (marked by "P") and Narrowband Secondary Synchronization Signal (NSSS) (marked by "S"), and the Narrowband Physical Broadcast Channel (NPBCH) (marked by "B").

According to one aspect of the disclosure, the UE 30 battery characteristics are leveraged to achieve further improvements in the amount of power that can be saved through the use of battery-aware adaptation of the communication protocols. Generally, the base station 20 uses information about a voltage response characteristic of the UE 30 battery to generate a battery model for predicting the life-time of the battery, tracks the battery usage pattern of the UE 30, and tailors the communication protocols based on the battery model and activity pattern of the UE 30 to match as closely as possible a pattern that is most favorable for extending the life-time of the battery. Further, the burden of tracking the UE 30 activity pattern and estimating the remaining life-time of the battery is placed on the base station 20 rather than the UE 30, which allows use of more sophisticated battery models and further reduces the power consumption of the UE 30.

In embodiments of the present disclosure, the base station 20 needs to determine the voltage response characteristic of the battery used by the UE 30, such as recommended current rating, recovery period, and discharge duration of the battery. The base station 20 may obtain this information by using a model designation of the battery or UE 30 to query a database containing information about the voltage response characteristic of the UE 30 battery. Because the battery characteristics tend to vary over the battery lifespan, the base station 20 can track the UE 30 activity pattern and thus dynamically obtain the UE 30 activity pattern. Using this information, the base station 20 can calculate the predicted life-time of the battery. This approach can be beneficial because the predicted battery life-time varies with the UE 30 activity pattern.

In some embodiments, the base station 20 may further adapt system parameters and/or configuration parameters so that the activity pattern is effective to extend the life-time of the battery. Examples of some battery-aware adaptations include:

breaking longer transmissions or reception intervals into several shorter intervals to reduce UE 30 power consumption;

varying duty cycle parameters to allow for sufficiently large recovery period and sufficiently small active period;

leverage uplink power control to increase or decrease the transmit power in a battery-friendly manner. By varying the transmit power, the sustained load current drawn from the battery can be controlled design a battery-friendly UE 30 activity pattern during the UE 30 idle mode to reduce power consumption or alter the duty-cycling parameters. This can be achieved by restricting attempts to access the network or by reducing the attempts to scan for paging information; and improve the UE 30 battery life by implementing a temperature-aware operation for UEs 30 equipped with temperature-sensitive batteries.

Battery-aware activity patterns can be achieved, for example, by configuring the system parameters such as the TBS size or transmission time interval (TTI), the number of repetitions, duration of the downlink transmission gap, power control parameters, DRX, eDRX, PSM, access barring, and time of day for transmission/reception in a battery-friendly manner. The battery-based adaptations should still meet the performance requirement of the IoT system.

The following discussion contains examples of how the activity pattern of the UE 30 can be controlled in a battery friendly manner to extend the life-time of the battery. These examples are not meant to be exhaustive, but rather to illustrate how battery-awareness can be incorporated into virtually any communication protocol to help extend battery life-time.

Battery Aware Power Control

In some embodiments, the base station 20 implements a battery-aware TPC mechanism to extend the life-time of the UE 30 battery. By tuning the transmit power of the UE 30 based on the voltage response characteristics of the battery, the load current during active mode can be controlled to extend the battery life-time.

As one example, the uplink TPC and the PHR can be used to adjust the transmit power of the UE 30. With TPC, the received power control target for a packet transmission can be adjusted so that the load current of the UE 30 in active mode more closely matches a preferred current load of the battery. The information conveyed by the PHR can aid the base station 20 in determining how many uplink subcarriers to schedule which impacts the UE 30 output power.

Battery-Aware Transmission Patterns

In some embodiments, the base station 20 can control the transmission activity of the UE 30 to more closely match a target discharge duration and/or recovery period of the battery that will extend the life-time of the UE 30 battery. By tuning the transmission pattern based on the voltage response characteristics of the battery, the base station 20 can control the duty-cycling behavior of the UE 30 to extend the battery life-time.

As one example, in NB-IoT the base station 20 may change the TBS and/or the number of repetitions on an UL transmission to alter the UE 30 transmission pattern. There are multiple ways of sending an N-bit packet (e.g., N=2400). The entire packet could be transmitted in a single transport block (e.g., TBS=2536, after overhead and padding), which requires a long continuous transmission time, and thus long continuous active period. Alternatively, the packet can be transmitted in two transport blocks, each with TBS equal to 1256 bits. The scheduler at the base station 20 can schedule these two transport blocks with a gap between them to allow a sufficient recovery period for the battery.

In another embodiment, the UE 30 can be configured to transmit a packet at a lower power level. NPUSCH transmit power depends on the bandwidth. Generally, higher bandwidth means greater transmit power. Thus, scheduling the packet with a 12-tone NPUSCH transmission will require the highest power level among all the NPUSCH bandwidth options. To reduce the NPUSCH power level, one can schedule NPUSCH with sub-Physical Resource Block (PRB) transmissions (e.g. 6, 3, one subcarrier). Thus, the number of subcarriers can be selected based on a target transmit power that matches a preferred current load on the battery.

In other embodiments, battery-aware HARQ retransmissions can be used to extend battery life-time. The base station 20 may instruct the UE 30 to postpone a HARQ retransmission by sending DCI to the UE 30 in a designated search space. Postponing a HARQ retransmission may increase the battery recovery period for the UE 30 as it enjoys a longer period without transmission activity.

Battery-Aware Reception Patterns

In some embodiment, the base station 20 controls the reception activity of the UE 30 to more closely match a target discharge duration and/or recovery period of the battery that will extend the life-time of the UE 30 battery. By tuning the reception pattern based on the voltage response characteristics of the battery, the base station 20 can control the duty-cycling behavior of the UE 30 to extend the battery life-time.

As one example, in the idle mode, the base station 20 adjusts the duration of DRX, eDRX, and PSM for a UE 30 based on the voltage response characteristics of the battery to match a preferred discharge duration and recovery period. By tuning the reception duration based on the voltage response characteristics of the battery, the base station 20 can extend the battery life-time.

Similarly, in some embodiments the base station 20 adjusts the reception activity pattern of a UE 30 in the connected mode. For example, consider a UE 30 in an NB-IoT network receiving data in the connected mode. Instead of having a continuous transmission of a long packet, the base station 20 may break the packet into smaller chunks. A Narrowband Physical Downlink Shared Channel (NPDSCH) transmission may comprise 1, 2, 4, 8, 16, 32, 64, 128, 192, 256, 384, 512, 768, 1024, 1536, or 2048 repetitions. The basic TTI comprises 1, 2, 3, 4, 5, 6, 7, 8, or 10 subframes. For a long transmission where the number of repetitions exceeds the downlink gap threshold, the base station 20 inserts a gap in between the transmissions during which the packet transmission is postponed until the end of the gap duration. The gap duration and periodicity can be configured by the base station 20. These parameters are specified in the Table 2 below. Therefore, a battery-aware configuration of these parameters may help operate the UE 30 in a battery-friendly manner.

TABLE 2

| Transmission Gap Configuration | |
| --- | --- |
| Downlink gap threshold (number of repetitions) | 32, 64, 128, 256 |
| Downlink gap periodicity (number of subframes) | 32, 64, 128, 256, 512 |
| Downlink gap duration coefficient | 1/8, 1/4, 3/8, 1/2 |
| Downlink gap duration (number of subframes) | Downlink gap duration coefficient*downlink gap periodicity |

In some embodiments, the base station 20 can control the search activity of the UE 30 to be more battery-friendly. For downlink transmission in NB-IoT, the UE 30 scans for DCI within a search space to obtain scheduling information, such as HARQ retransmissions. To provide a more battery-friendly search pattern, the base station 20 can increase the periodicity of the search space to afford the UE 30 an enhanced battery recovery period by requiring the UE 30 to scan for DCI less frequently. Moreover, the base station 20 can reduce the number of subframes within a search space that the UE 30 needs to monitor by tuning $R_{max}$. The search space period ranges from $4 < T \leq 131072$ subframes for Type-2 CSS and USS. Because $T = GR_{max}$, the base station 20 can tune the period by setting the parameter G and the number of repetitions $R_{max}$ where G takes the values 1.5, 2, 4, 8, 16, 32, 48, 64; and $R_{max}$ is 2048 (or a smaller value from the allowed set of maximum repetition factor for NPDCCH).

Battery-Aware Temperature-Dependent UE Scheduling

In some embodiments, control of the transmission activity and/or reception activity may further be based on temperature of the UE 30, the temperature of the ambient environment, or both. The base station 20 obtains temperature information, for example, from a weather database if the UE 30 location and/or tracking area is known, or from the UE 30 via uplink signaling. The base station 20 can then control the UE 30 activity based on the temperature or weather pattern, in addition to the voltage response characteristics. The temperature may be, for example, an average daytime temperature, an average nighttime temperature, or both. Other statistics related to temperature could also be used. It should be noted that the voltage response characteristics may be temperature dependent, so taking the temperature information into account allows for better battery management.

As an example, a battery operating in warm and sunny conditions may last longer than the one operating in a colder environment. Therefore, the network may schedule UEs 30 for data transmission or reception during battery-friendly environmental conditions. That is, transmission and/or reception activity can be avoided during periods when it creates the largest drain on the battery and postponed to periods when the battery drain is less.

Battery-Aware Scheduling and Resource Allocation in Connected Mode

In some embodiments, the base station 20 determines the network-level resource allocation and scheduling pattern for all UEs 30 using the techniques described above. This step aims to match the activity patterns of all UEs 30 in the cell to favorable battery usage patterns while meeting communication-related performance goals. The base station 20 categorizes the UEs 30 based on the activity patterns and makes scheduling/resource allocation decisions on a UE 30 category level.

As an example, in NB-IoT Release 13, a mechanism called access barring allows the base station 20 to control the access of users based on UE 30 category. There are 10 normal and 5 special access classes. When access barring is activated, a UE 30 first checks if it belongs to the barred class before accessing the network (this information is acquired during the cell search and synchronization procedure). A new access category based on the UE 30 battery class can be defined. To ensure a battery-friendly UE 30 activity pattern, the base station 20 may use access barring to prevent UEs 30 of a certain category from accessing the network at a certain period. One motivation is that UEs 30 with batteries sensitive to temperature could be prevented from accessing the network during an unfavorable time of day. A UE 30 may belong to more than one access class. In this case, the UE 30 may access the network if none of its classes is barred.

Figure 8:
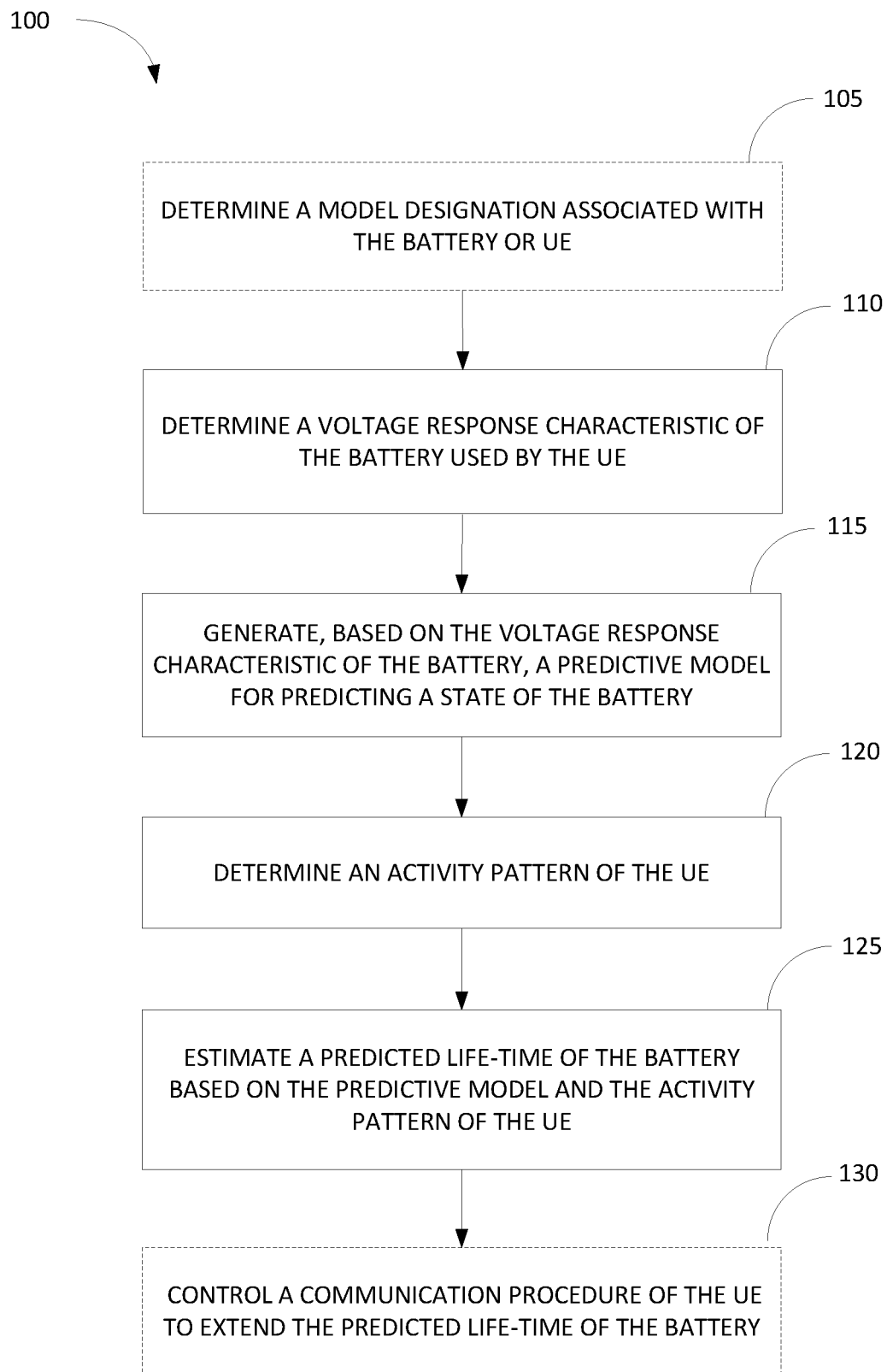
FIG. 8 illustrates an exemplary method implemented by a base station or other network node for monitoring the state of the battery in a UE.

FIG. 8 illustrates an exemplary method 100 implemented by a base station 20 or a network node for monitoring a state of the UE 30 battery. Blocks shown in dotted lines are optional steps. The base station 20 optionally determines a model designation indicative of the specific product type (e.g., model) of the battery used by the UE 30, or a model designation of the UE 30 (block 105). The base station 20 may receive the model designation from either the UE 30 or from another network node. In one example, the UE 30 transmits a model designation of the battery or UE 30 to the base station 20 in an uplink message. In another embodiment, the base station 20 may request the model designation of the battery from another network node using a UE 30 identifier or model number of the UE 30.

In block 110, the base station 20 determines a voltage response characteristic of the battery used by the UE 30. The term "voltage response characteristic" refers to characteristics of the battery that determine how the battery voltage responds to different current loads and activity patterns. Examples of voltage response characteristics include the sustained current rating of the battery, the recovery period of the battery, and the discharge duration of the battery. In some embodiments, the base station 20 uses the model designation obtained in block 105 to determine the voltage response characteristic. For example, the base station 20 can use the model designation to look up the voltage response characteristic in a table or database. In other embodiments, the voltage response characteristic can be obtained without the use of the model designation of the battery. For example, the base station 20 could use a model designation or serial number of the UE 30 to look up the voltage response characteristic of the battery in a table or database. As another example, the base station 20 can use a UE 30-specific identifier (e.g., International Mobile Subscriber Identifier (IMSI)) to look up the voltage response characteristic for the battery used by the UE 30.

The base station 20 uses the voltage response characteristic determined in block 110 to generate a predictive model for predicting a state (e.g., the SOC) and remaining life-time of the battery (block 115). Once the predictive model is generated, the base station 20 can use the predictive model to predict the current SOC and remaining life-time of the battery based on the activity pattern of the UE 30. The base station 20 monitors the UE 30 activity and determines a UE 30 activity pattern (block 120). The UE 30 activity pattern is input to the predictive model to estimate a SOC and predicted life-time of the battery (block 125). In some embodiments, the base station 20 may use the estimates of the SOC and predicted life-time of the battery to control operation (e.g., a communication procedure) of the UE 30 (block 130).

Some embodiments of the method 100 further comprises determining a product designation associated with the UE 30 or the battery, and determining the voltage response characteristic based on the product designation for the UE 30 or battery. The product designation of the UE 30 or the battery may, in some instances, be received from the UE 30. In other instances, the base station 20 may first determine a UE 30 type and then determine the product designation associated with the battery model based on the UE 30 type. In this case, the base station 20 may receive an indication of the UE 30 type from the UE 30 in information transmitted by the UE 30, or from another network node.

In some embodiments of the method 100, the voltage response characteristic of the battery comprises at least one of a sustained current load, a recovery period, or a discharge duration.

Some embodiments of the method 100 further comprise determining a temperature associated with the UE 30 location during one or more time periods and predicting the remaining life-time of the battery further depending on the temperature associated with the UE 30 location. The temperature may comprise an average daytime temperature, an average nighttime temperature, or both. Other statistics related to the temperature could also be used.

Some embodiments of the method 100 further comprise controlling operation of the UE 30 to increase the predicted life-time of the battery.

In some embodiments of the method 100, controlling operation of the UE 30 to increase the predicted life-time of the battery comprises controlling data transmission by the UE 30 dependent on the voltage response characteristic of the battery.

In some embodiments of the method 100, controlling operation of the UE 30 to increase the predicted life-time of the battery comprises controlling data reception by the UE 30 dependent on the voltage response characteristic of the battery.

In some embodiments of the method 100, controlling operation of the UE 30 to increase the predicted life-time of the battery comprises controlling a search procedure used by the UE 30 dependent on the voltage response characteristic of the battery.

In some embodiments of the method 100, controlling operation of the UE 30 to increase the predicted life-time of the battery comprises controlling retransmission by the UE 30 dependent on the voltage response characteristic of the battery.

In some embodiments of the method 100, controlling operation of the UE 30 to increase the predicted life-time of the battery comprises controlling a discontinuous reception mode or power saving mode of the UE 30.

Figure 9:
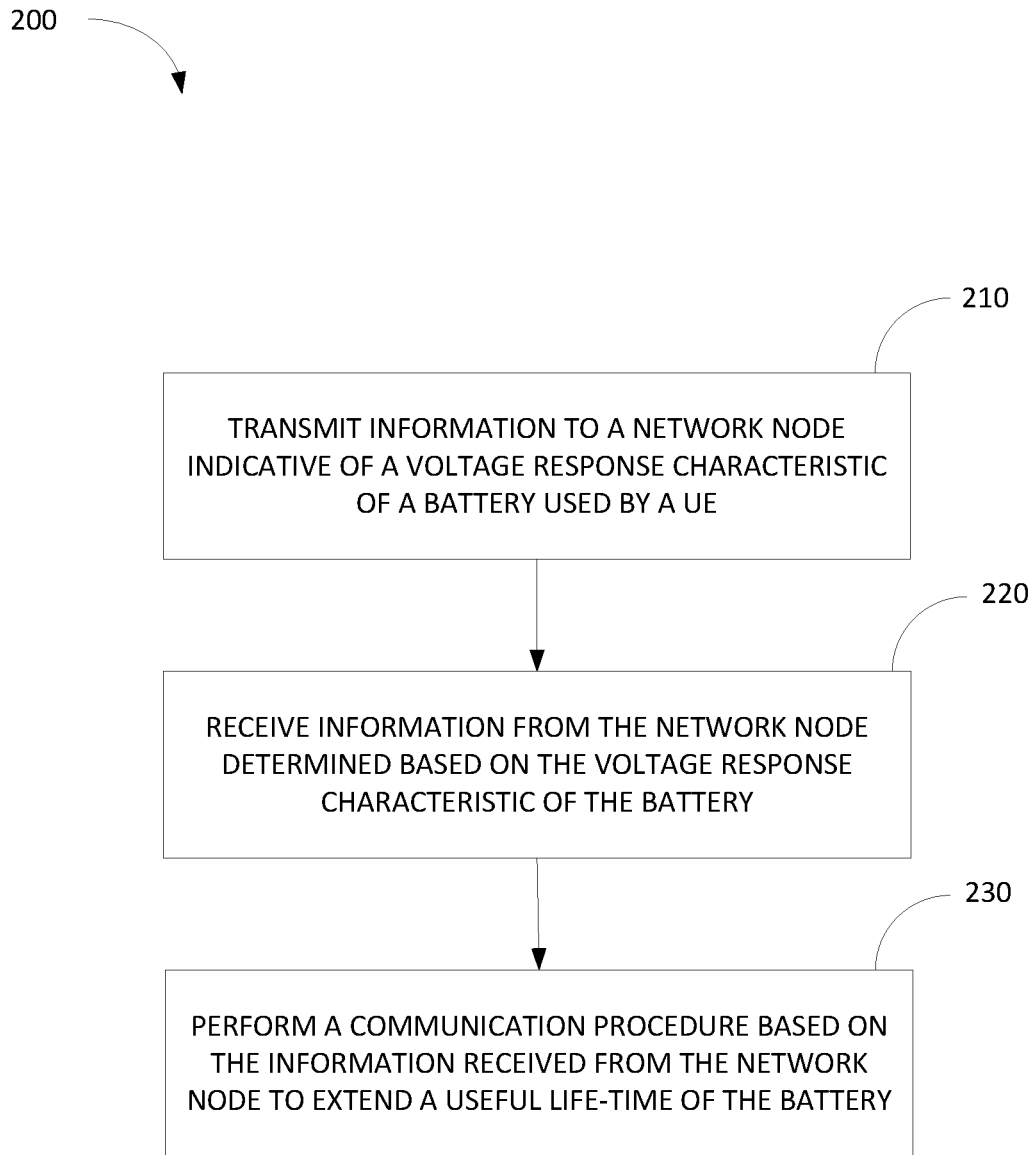
FIG. 9 illustrates an exemplary method implemented by a UE to support battery-aware communication procedures.

FIG. 9 illustrates a complementary method 200 performed by the UE 30 to support battery-aware communication protocols and procedures. The UE 30 transmits information to a base station 20 or a network node indicative of a voltage response characteristic of a battery used by the UE 30 (block 210). The UE 30 subsequently receives information from the base station 20 determined based on the voltage response characteristic of the battery (block 220). The UE 30 performs an operation (e.g., a communication procedure) based on the information received from the base station 20 (block 230) to extend a useful life-time of the battery.

In some embodiments of the method 200, transmitting information to a base station 20 indicative of a voltage response characteristic of a battery used by the UE 30 comprises transmitting a product or model designation associated with the UE 30 or the battery.

In some embodiments of the method 200, the voltage response characteristic comprises at least one of a sustained current load, a recovery period, or a discharge duration.

Some embodiments of the method 200 further comprise transmitting a temperature measurement to the base station 20 for use in controlling the operation of the UE 30. In one embodiment, the temperature measurement comprises at least one of an average daytime temperature and an average nighttime temperature.

In some embodiments of the method 200, performing a communication procedure based on the information received from the base station 20 to extend the life-time of the battery comprises performing a data transmission by the UE 30 dependent on the voltage response characteristic of the battery.

In some embodiments of the method 200, performing a communication procedure based on the information received from the base station 20 to extend the life-time of the battery comprises performing a data reception by the UE 30 based on the information received from the base station 20.

In some embodiments of the method 200, performing a communication procedure based on the information received from the base station 20 to extend the life-time of the battery comprises performing a search procedure based on the information received from the base station 20.

In some embodiments of the method 200, performing a communication procedure based on the information received from the base station 20 to extend the life-time of the battery comprises performing a retransmission based on the information received from the base station 20.

In some embodiments of the method 200, performing a communication procedure based on the information received from the base station 20 to extend the life-time of the battery comprises operating in a discontinuous reception mode or power saving mode of the UE 30 based on the information received from the base station 20.

Figure 10:
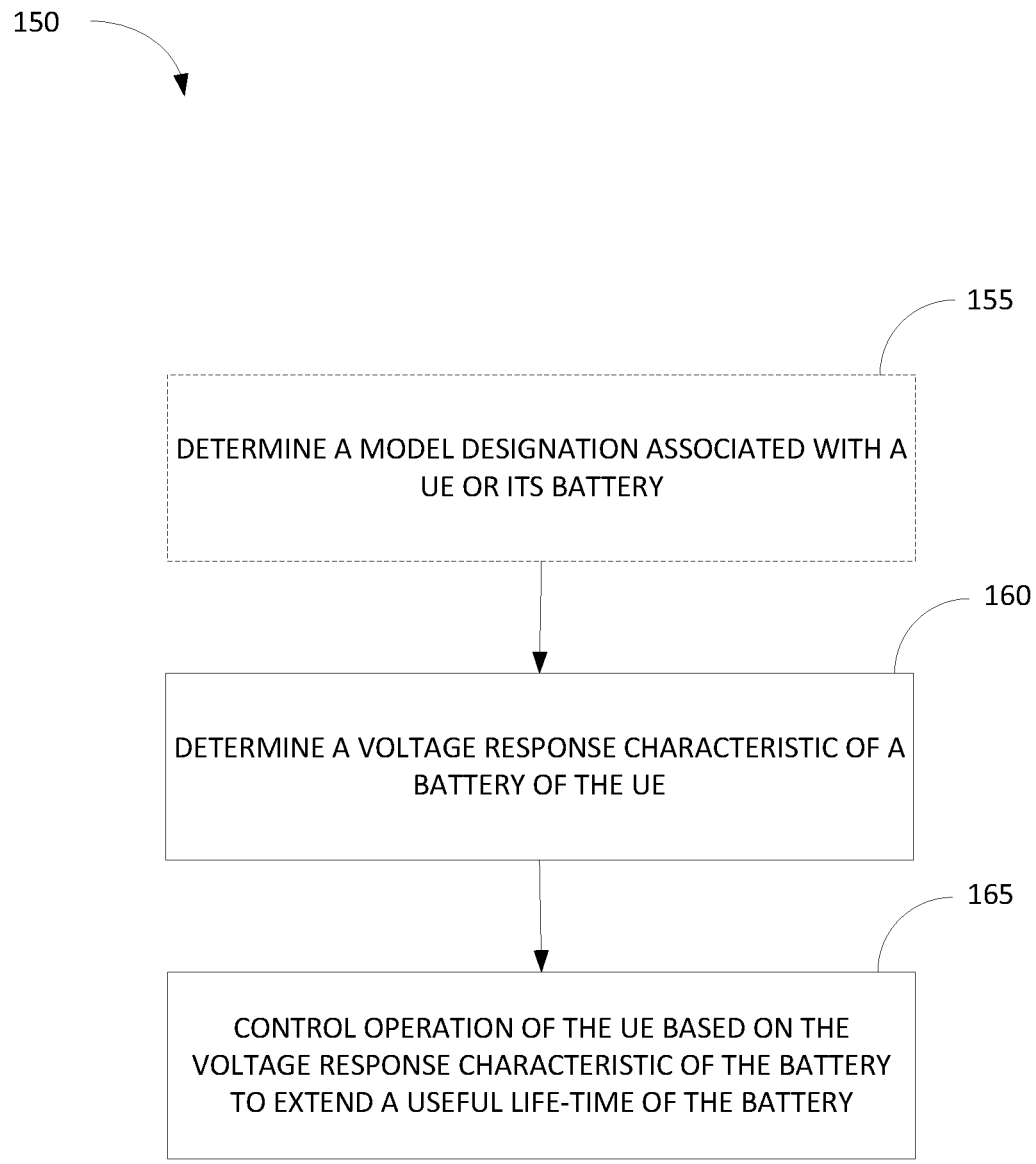
FIG. 10 illustrates an exemplary method implemented by a base station or other network node for predicting the remaining life-time of the battery in a UE.

FIG. 10 illustrates another exemplary method 150 implemented by a base station 20 or a network node according to one embodiment of the disclosure. The base station 20 optionally determines a designation of the UE 30 model or battery model (block 155). In some embodiments, the UE 30 may transmit model designation of the battery or UE 30 to the base station 20. In other embodiments, the base station 20 may obtain the model designation of the battery from another network node. Such information may, for example, be stored in a subscriber database. Based on the information about the UE 30 model or battery model, the base station 20 determines a voltage response characteristic of the UE 30 battery, such as the sustained current rating, the recovery period of the battery, and/or discharge duration of the battery (block 160). After determining the voltage response characteristic of the battery, the base station 20 controls the operation of the UE 30 based on the voltage response characteristic of the battery to extend the useful life-time of the battery (block 165).

Some embodiments of the method 150 further comprise determining a product designation associated with the UE 30 or the battery, and determining the voltage response characteristic based on the product designation for the UE 30 or battery. The product designation of the UE 30 or the battery may, in some instances, be received from the UE 30. In other instances, the base station 20 may first determine a UE 30 type and then determine the product designation associated with the battery model based on the UE 30 type. In this case, the base station 20 may receive an indication of the UE 30 type from the UE 30 in information transmitted by the UE 30 or from another network node.

In some embodiments of the method 150, the voltage response characteristic of the battery comprises at least one of a sustained current load, a recovery period, or a discharge duration.

In some embodiments of the method 150, controlling the operation of the UE 30 based on the voltage response characteristic of the battery comprises controlling an uplink transmission based on the voltage response characteristic of the battery. In one example, controlling an uplink transmission based on the voltage response characteristic of the battery comprises scheduling the uplink transmissions based at least in part on the discharge duration of the battery, the recovery period of the battery, or both.

In some embodiments of the method 150, controlling an uplink transmission based on the voltage response characteristic of the battery comprises adjusting a transmission interval for the uplink transmission based at least in part on the discharge duration of the battery, the recovery period of the battery, or both. In one embodiment, adjusting a transmission interval comprises adjusting a transport block size for the uplink transmission based on the discharge duration of the battery. In another embodiment, adjusting a transmission interval comprises adjusting a number of repetitions for the uplink transmission based on the discharge duration of the battery.

In some embodiments of the method 150, controlling an uplink transmission based on the voltage response characteristic of the battery comprises controlling a transmit power of the uplink transmission based at least in part on the sustained current load of the battery. In one embodiment, the base station 20 controls a bandwidth of the uplink transmission based at least in part on the sustained current load of the battery.

In some embodiments of the method 150, controlling an uplink transmission based on the voltage response characteristic of the battery comprises controlling a retransmission based on the recovery period of the battery. In one embodiment, the base station 20 controlling the retransmission based on the recovery period of the battery comprises adjusting a gap between two or more retransmissions based on the recovery period of the battery. In one embodiment, the base station 20 controlling the retransmission based on the recovery period of the battery comprises scheduling the retransmission based on the recovery period of the battery.

In some embodiments of the method 150, controlling the operation of the UE 30 based on the voltage response characteristic of the battery comprises controlling reception by the UE 30 of downlink transmissions based on the voltage response characteristic of the battery.

In some embodiments of the method 150, controlling reception by the UE 30 of downlink transmissions based on the voltage response characteristic of the battery comprises adjusting a transmission interval of a downlink transmission to the UE 30 based at least in part on the discharge duration of the battery, the recovery period of the battery, or both. For example, the base station 20 can adjust the transmission interval by adjusting a transport block size for the downlink transmission, the number of repetitions for the downlink transmission, or both depending on the recovery period of the battery.

In some embodiments of the method 150, controlling reception by the UE 30 of downlink transmissions based on the voltage response characteristic of the battery comprises adjusting a discontinuous reception (DRX) configuration of the UE 30 for idle mode operation based at least in part on the discharge duration of the battery, the recovery period of the battery, or both.

In some embodiments of the method 150, controlling reception by the UE 30 of downlink transmissions based on the voltage response characteristic of the battery comprises adjusting a power saving mode (PSM) configuration of the UE 30 for idle mode operation based at least in part on the discharge duration of the battery, the recovery period of the battery, or both.

In some embodiments of the method 150, controlling reception by the UE 30 of downlink transmissions based on the voltage response characteristic of the battery comprises adjusting a downlink gap threshold for the downlink transmission based on the recovery period of the battery.

In some embodiments of the method 150, controlling reception by the UE 30 of downlink transmissions based on the voltage response characteristic of the battery comprises adjusting a downlink control information (DCI) search parameter based at least in part on the voltage response characteristic of the battery. For example, in one embodiment, the base station 20 adjusts a periodicity at which the UE 30 searches for DCI based at least in part on the discharge duration of the battery, the recovery period of the battery, or both. In another embodiment, the base station 20 adjusts a search space over which the UE 30 searches for DCI based at least in part on the discharge duration of the battery, the recovery period of the battery, or both.

In some embodiments of the method 150, the voltage response characteristic is temperature dependent, wherein the method further comprises controlling the operation of the UE 30 based on a temperature associated with the UE 30. For example, in one embodiment the base station 20 bars access by the UE 30 to the network during a predetermined time period based on the voltage response characteristic of the battery and the temperature.

Figure 11:
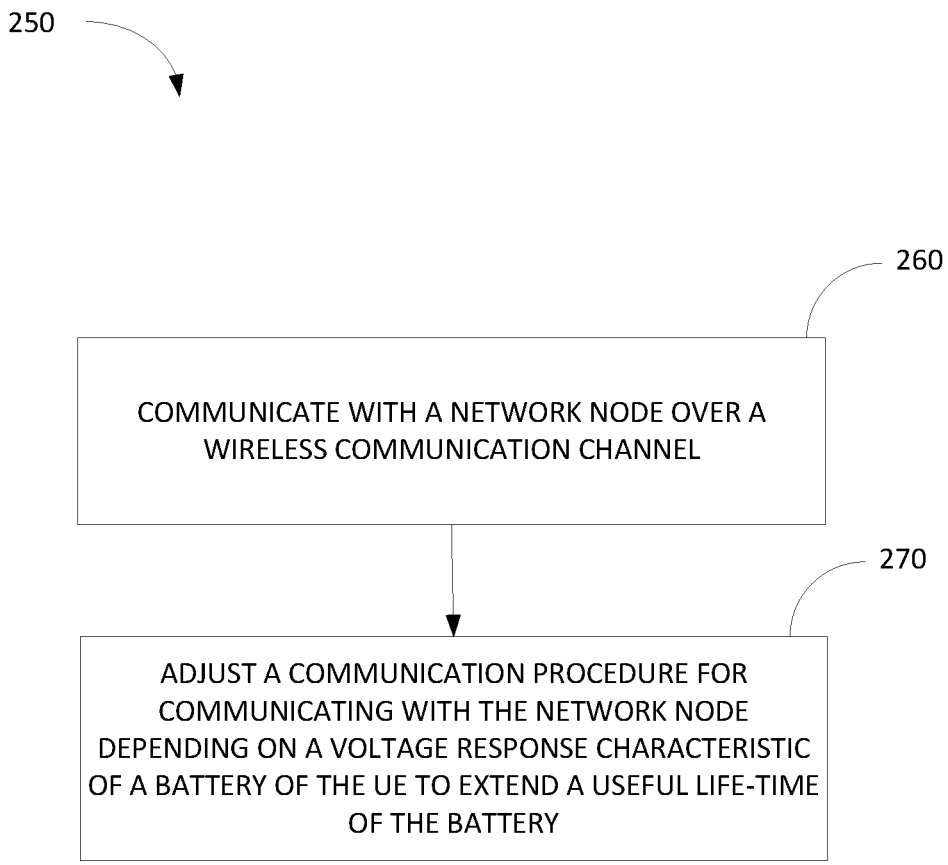
FIG. 11 illustrates an exemplary method implemented by a UE to support battery-aware communication procedures.

FIG. 11 illustrates a complementary method 250 performed by the UE 30 to support battery-aware communication protocols and procedures. The UE 30 communicates with a base station 20 or a network node over a wireless communication channel (block 260). The UE 30 adjusts a communication procedure for communicating with the base station 20 depending on a voltage response characteristic of a battery of the UE 30 to extend a useful life-time of the battery (block 270).

In some embodiments of the method 250, the UE 30 further receives information from the base station 20 determined based on the voltage response characteristic of the battery. The adjustment to the communication procedure is made responsive to the information received from the base station 20.

In some embodiments of the method 250, the voltage response characteristic of the battery comprises at least one of a sustained current load, a recovery period, or a discharge duration.

In some embodiments of the method 250, adjusting a communication procedure for communicating with a base station 20 comprises controlling an uplink transmission based on the voltage response characteristic of the battery. In one example, controlling an uplink transmission based on the voltage response characteristic of the battery comprises scheduling the uplink transmissions based at least in part on the discharge duration of the battery, the recovery period of the battery, or both.

In some embodiments of the method 250, controlling an uplink transmission based on the voltage response characteristic of the battery comprises adjusting a transmission interval for the uplink transmission based at least in part on the discharge duration of the battery, the recovery period of the battery, or both. In one embodiment, adjusting a transmission interval comprises adjusting a transport block size for the uplink transmission based on the discharge duration of the battery. In another embodiment, adjusting a transmission interval comprises adjusting a number of repetitions for the uplink transmission based on the discharge duration of the battery.

In some embodiments of the method 250, adjusting a communication procedure for communicating with a base station 20 comprises adjusting a transmission interval for the uplink transmission based at least in part on the discharge duration of the battery, the recovery period of the battery, or both. In one embodiment, adjusting a transmission interval comprises adjusting a transport block size for the uplink transmission based on the discharge duration of the battery. In another embodiment, adjusting a transmission interval comprises adjusting a number of repetitions for the uplink transmission based on the discharge duration of the battery.

In some embodiments of the method 250, controlling an uplink transmission based on the voltage response characteristic of the battery comprises adjusting a transmit power of the uplink transmission based at least in part on the sustained current load of the battery. In one embodiment, the UE 30 controls a bandwidth of the uplink transmission based at least in part on the sustained current load of the battery.

In some embodiments of the method 250, controlling an uplink transmission based on the voltage response characteristic of the battery comprises controlling a retransmission based on the recovery period of the battery. In one embodiment, the UE 30 controlling the retransmission based on the recovery period of the battery comprises adjusting a gap between two or more retransmissions based on the recovery period of the battery. In one embodiment, the UE 30 controlling the retransmission based on the recovery period of the battery comprises scheduling the retransmission based on the recovery period of the battery.

In some embodiments of the method 250, controlling the operation of the UE 30 based on the voltage response characteristic of the battery comprises controlling reception by the UE 30 of downlink transmissions based on the voltage response characteristic of the battery.

In some embodiments of the method 250, controlling reception by the UE 30 of downlink transmissions based on the voltage response characteristic of the battery comprises adjusting a transmission interval of a downlink transmission to the UE 30 based at least in part on the discharge duration of the battery, the recovery period of the battery, or both. For example, the UE 30 can adjust the transmission interval by adjusting a transport block size for the downlink transmission, the number of repetitions for the downlink transmission, or both depending on the recovery period of the battery.

In some embodiments of the method 250, controlling reception by the UE 30 of downlink transmissions based on the voltage response characteristic of the battery comprises adjusting a discontinuous reception (DRX) configuration of the UE 30 for idle mode operation based at least in part on the discharge duration of the battery, the recovery period of the battery, or both.

In some embodiments of the method 250, controlling reception by the UE 30 of downlink transmissions based on the voltage response characteristic of the battery comprises adjusting a power saving mode (PSM) configuration used in idle mode based at least in part on the discharge duration of the battery, the recovery period of the battery, or both.

In some embodiments of the method 250, controlling reception by the UE 30 of downlink transmissions based on the voltage response characteristic of the battery comprises adjusting a downlink gap threshold for the downlink transmission depending on the recovery period of the battery.

In some embodiments of the method 250, controlling reception by the UE 30 of downlink transmissions based on the voltage response characteristic of the battery comprises adjusting a downlink control information (DCI) search parameter based at least in part on the voltage response characteristic of the battery. For example, in one embodiment, the UE 30 adjusts a periodicity at which the UE 30 searches for DCI based at least in part on the discharge duration of the battery, the recovery period of the battery, or both. In another embodiment, the UE 30 adjusts a search space over which the UE 30 searches for DCI based at least in part on the discharge duration of the battery, the recovery period of the battery, or both.

The methods herein described can be implemented by any functional means, modules, units, or circuitry. In one embodiment, for example, an apparatus configured to perform the methods comprises respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 12:
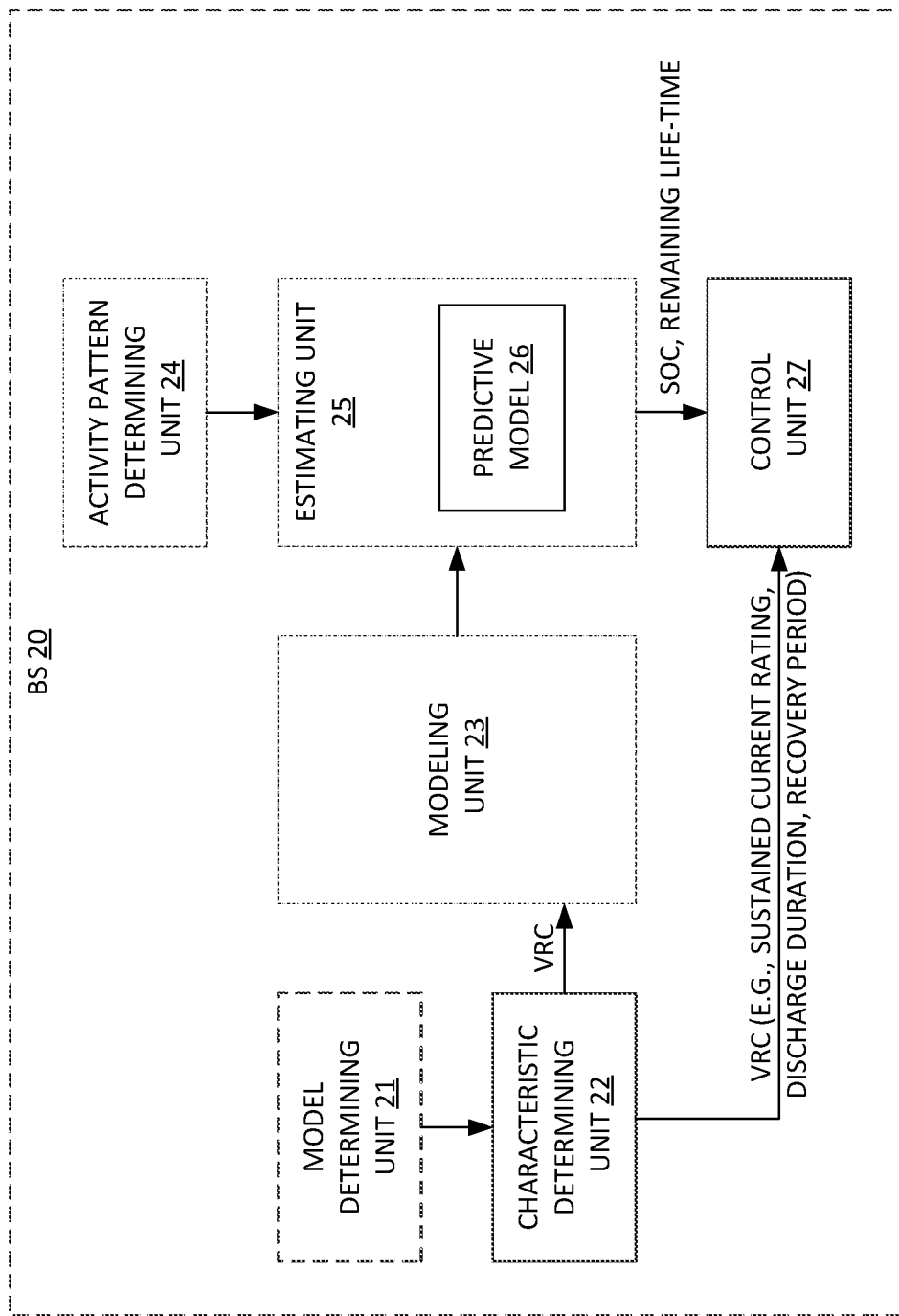
FIG. 12 illustrates an exemplary base station configured to perform battery state monitoring according to an embodiment.

FIG. 12 illustrates an exemplary base station 20 according to one embodiment. Components shown in dotted lines are considered optional. The base station 20 includes a model determining unit 21, a characteristic determining unit 22, a modeling unit 23, an activity pattern determining unit 24, an estimating unit 25, and a control unit 27. The base station 20 represents one type of network node in which the techniques herein described may be implemented. Those skilled in the art will appreciate, however, that the methods implemented by the base station 20 could also be performed by other network nodes in the wireless communication network.

The model determining unit 21, when present, determines or receives a model designation or other information from the UE 30 or from the network from which the base station 20 can determine the specific battery used by a UE 30. The characteristic determining unit 22 determines a voltage response characteristic of the battery used by the UE 30. In some embodiments, the characteristic determining unit 22 uses the model designation of the battery or UE 30 to look up the voltage response characteristic in a table or database. In other embodiments without a model determining unit 21, the characteristic determining unit 22 uses the UE 30 identifier or serial number to look up the voltage response characteristic in a table or database.

The modeling unit 23, when present, generates a predictive model 26 for the battery based on the voltage response characteristic received from the characteristic determining unit 22. For example, the predictive model 26 may comprise a parametric model that uses the voltage response characteristic as an input parameter to predict the SOC and remaining life-time of the battery. For example, the hybrid KiBaM model is a parameterized model that takes rate capacity and recovery effects into account. The KiBaM model is suitable for use in small devices using coin cell batteries. The KiBaM is described in Kim, *A Hybrid Battery Model Capable of Capturing Dynamic Circuit Characteristics and Nonlinear Capacity Effects*, IEEE Transactions on Energy Conversion, Vol. 26, No. 4, December 2011 and Feeney, *Towards a Better Battery Model for INET*, Proceedings of the "OMNet++ Community Summit 2016," which are herein incorporated by reference in their entirety for all purposes.

The activity pattern determining unit 24 monitors the transmission and reception activity of the UE 30 to determine an activity pattern of the UE 30. For example, the activity pattern determining unit 24 may track the TBS size or TTI interval for uplink transmission, the number of repetitions for uplink transmission, the duration of the downlink transmission gap, power control parameters, DRX, eDRX, PSM, access barring, and time of day for transmission/reception. Statistical techniques can be used to summarize the activity patterns of the UE 30.

The predictive model from the modeling unit 23 and the UE 30 activity pattern is provided to the estimating unit 25. The estimating unit 25, when present, uses the predictive model of the battery to estimate the SOC and remaining life-time of the battery based on the UE 30 activity pattern. The SOC, remaining life-time prediction, or both, can be output to the control unit 27.

The control unit 27 receives the voltage response characteristic from the characteristic determining unit 22, as well as the SOC and/or remaining life-time prediction from the estimating unit 25 when present. As previously explained, the control unit 27 can adapt the activity patterns of the UE 30 based on the voltage response characteristic to extend the life-time of the battery. Various techniques have been described for adapting the transmit power, transmission activity, and reception activity of the UE 30 to extend the battery life. In some embodiments, the adaptations can also be made based on the SOC and/or remaining life-time prediction in addition to the voltage response characteristic. Thus, the activity pattern of the UE 30 may be modified as the battery approaches the end of its life-time.

Figure 13:
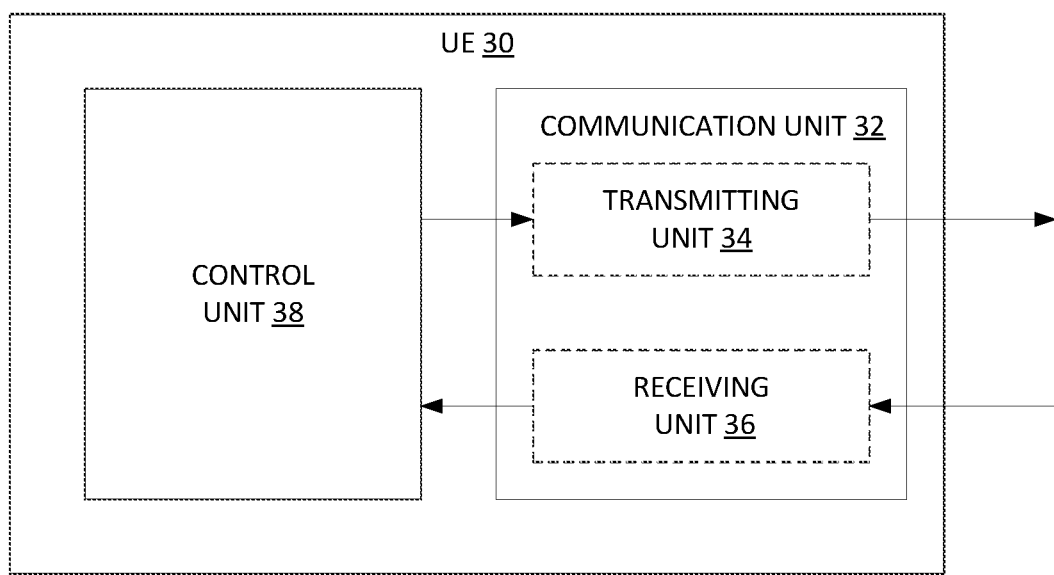
FIG. 13 illustrates an exemplary UE configured to support battery-aware communication procedures according to an embodiment.

FIG. 13 illustrates an exemplary UE 30 according to one embodiment. The UE 30 includes a communication unit 32 and a control unit 38. The communication unit 32 is configured to communicate with a base station 20 over a wireless communication channel. The control unit 38 is configured to adjust a communication procedure for communicating with a base station 20 depending on the voltage response characteristic of the battery to extend a useful life-time of the battery.

In one embodiment, the communication unit 32 comprises a transmitting unit 34 and receiving unit 36. The transmitting unit 34 is configured to transmit model designation for the battery or UE 30 to the base station 20, which the base station 20 may use to look up the voltage response characteristic of the battery used by the UE 30. The receiving unit 36 is configured to receive, from the base station 20, information determined based on the voltage response characteristic of the battery.

Figure 14:
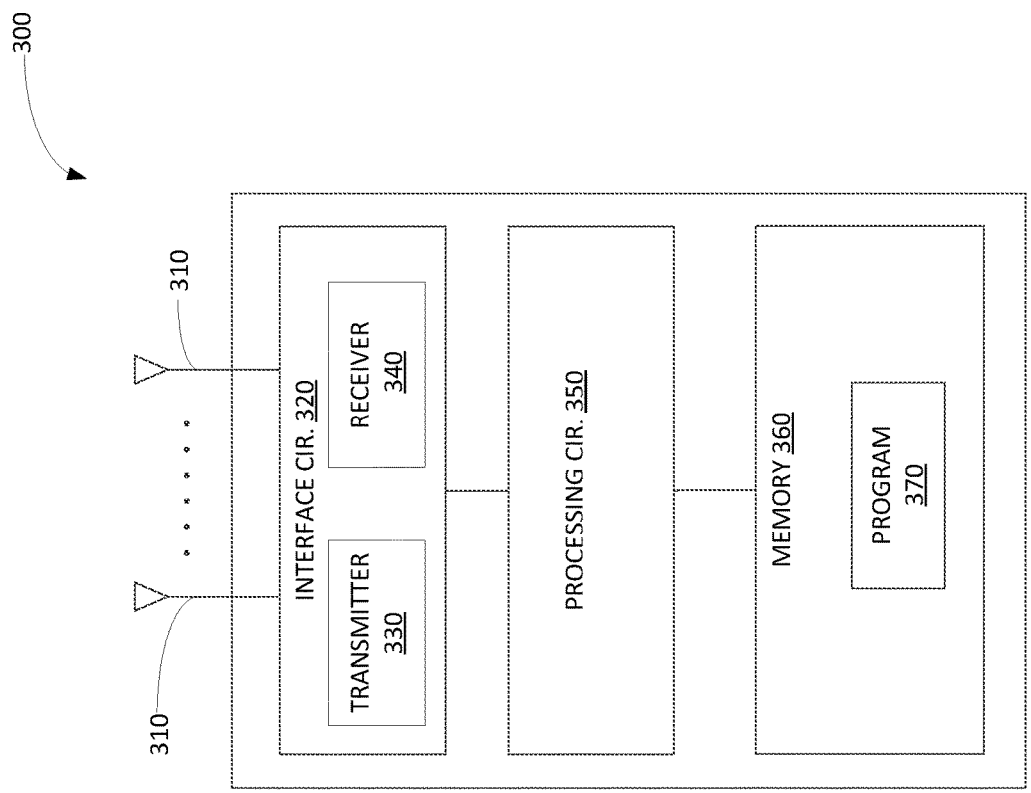
FIG. 14 illustrates an exemplary base station configured to perform battery state monitoring.

FIG. 14 illustrates a base station 300 according to another embodiment. The base station 300 comprises an antenna array with multiple antenna elements 310, an interface circuit 320, a processing circuit 350, and memory 360.

The interface circuit 320 is coupled to the antennas 310 and comprises the radio frequency (RF) circuitry needed for transmitting and receiving signals over a wireless communication channel. In one embodiment, the interface circuit 320 comprises a transmitter 330 and receiver 340 configured to operate according to the LTE-M or NB-IoT standards. The processing circuit 350 controls the overall operation of the base station 300 and processes the signals transmitted to or received by the base station 300. The processing circuit 350 is configured to control or adapt the activity pattern of the UE based on the voltage response characteristic of the UE battery to extend the life-time of the battery in the UE as herein described. The processing circuit 350 may comprise one or more microprocessors, hardware, firmware, or a combination thereof.

Memory 360 comprises both volatile and non-volatile memory for storing computer program code and data needed by the processing circuit 350 for operation. Memory 360 may comprise any tangible, non-transitory computer-readable storage medium for storing data including electronic, magnetic, optical, electromagnetic, or semiconductor data storage. Memory 360 stores a computer program 370 comprising executable instructions that configure the processing circuit 350 to implement the methods 100 and 150 according to FIGS. 8 and 10 as described herein. A computer program 370 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 370 for configuring the processing circuit 350 as herein described may be stored in a removable memory, such as a portable compact disc, portable digital video disc, or other removable media. The computer program 370 may also be embodied in a carrier such as an electronic signal, optical signal, radio signal, or computer readable storage medium.

Figure 15:
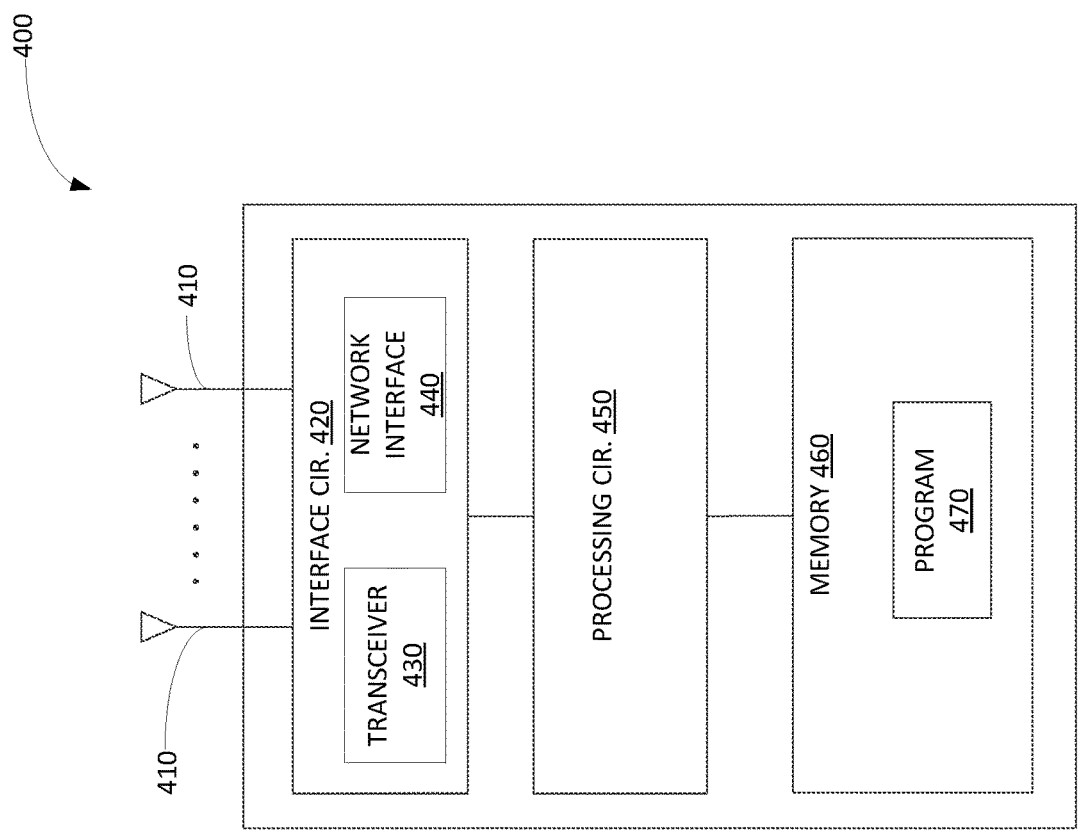
FIG. 15 illustrates an exemplary UE configured to support battery-aware communication procedures.

FIG. 15 illustrates a UE 400 according to another embodiment. The UE 400 comprises an antenna array with multiple antenna elements 410, an interface circuit 420, a processing circuit 450, and memory 460.

The interface circuit 420 is coupled to the antennas 410 and comprises the radio frequency (RF) circuitry needed for transmitting and receiving signals over a wireless communication channel. In one embodiment, the interface circuit 420 comprises a transmitter 430 and receiver 440 configured to operate according to the LTE-M or NB-IoT standards. The processing circuit 450 controls the overall operation of the UE 400 and processes the signals transmitted to or received by the UE 400. The processing circuit 450 is configured to control or adapt the activity pattern of the UE responsive to information received from the base station 300 as herein described. The processing circuit 450 may comprise one or more microprocessors, hardware, firmware, or a combination thereof.

Memory 460 comprises both volatile and non-volatile memory for storing computer program code and data needed by the processing circuit 450 for operation. Memory 460 may comprise any tangible, non-transitory computer-readable storage medium for storing data including electronic, magnetic, optical, electromagnetic, or semiconductor data storage. Memory 460 stores a computer program 470 comprising executable instructions that configure the processing circuit 450 to implement the method 200 according to FIGS. 9 and 11 as described herein. A computer program 470 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 470 for configuring the processing circuit 450 as herein described may be stored in a removable memory, such as a portable compact disc, portable digital video disc, or other removable media. The computer program 470 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The methods and apparatus herein described enable the base station to control the activity patterns of the UE in a manner that will prolong or extend the life-time of the UE battery by tailoring the transmission and reception activity of the UE according to the battery characteristic.

Additional Embodiments

Figure 16:
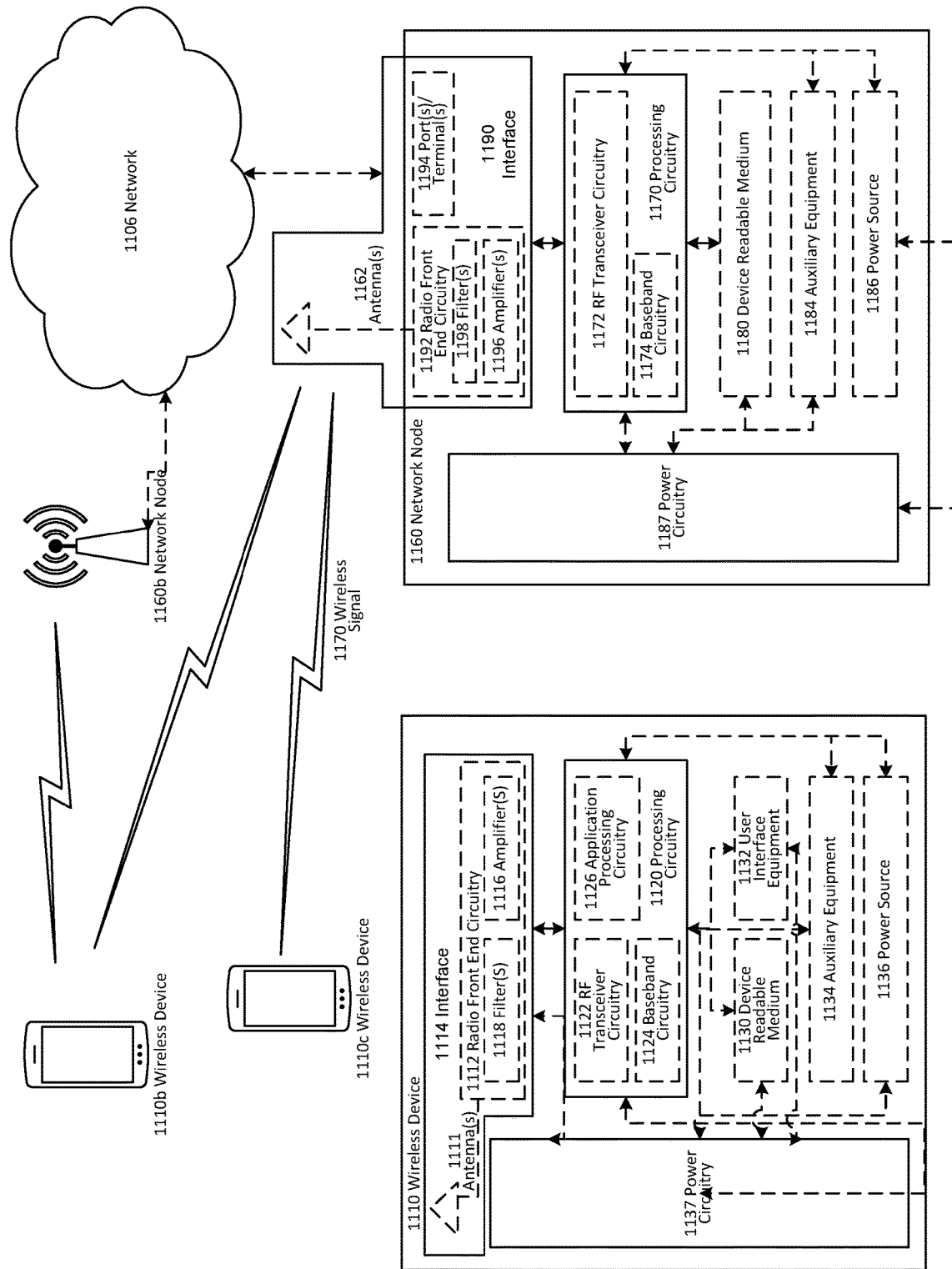
FIG. 16 illustrates an exemplary wireless network according to an embodiment.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 1106, network nodes 1160 and 1160b, and WDs 1110, 1110b, and 1110c. In practice, a wireless network may further include any additional elements suitable to support communication between wireless devices or between a wireless device and another communication device, such as a landline telephone, a service provider, or any other network node or end device. Of the illustrated components, network node 1160 and wireless device (WD) 1110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1160 and WD 1110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 1160 includes processing circuitry 1170, device readable medium 1180, interface 1190, auxiliary equipment 1184, power source 1186, power circuitry 1187, and antenna 1162. Although network node 1160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1160 are depicted as single boxes located within a larger box, or nested within multiple boxes, in practice, a network node may comprise multiple different physical components that make up a single illustrated component (e.g., device readable medium 1180 may comprise multiple separate hard drives as well as multiple RAM modules).

Similarly, network node 1160 may be composed of multiple physically separate components (e.g., a NodeB component and an RNC component, or a BTS component and a BSC component, etc.), which may each have their own respective components. In certain scenarios in which network node 1160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1160 may be configured to support multiple radio access technologies (RATs). In such embodiments, some components may be duplicated (e.g., separate device readable medium 1180 for the different RATs) and some components may be reused (e.g., the same antenna 1162 may be shared by the RATs). Network node 1160 may also include multiple sets of the various illustrated components for different wireless technologies integrated into network node 1160, such as, for example, GSM, WCDMA, LTE, NR, WiFi, or Bluetooth wireless technologies. These wireless technologies may be integrated into the same or different chip or set of chips and other components within network node 1160.

Processing circuitry 1170 is configured to perform any determining, calculating, or similar operations (e.g., certain obtaining operations) described herein as being provided by a network node. These operations performed by processing circuitry 1170 may include processing information obtained by processing circuitry 1170 by, for example, converting the obtained information into other information, comparing the obtained information or converted information to information stored in the network node, and/or performing one or more operations based on the obtained information or converted information, and as a result of said processing making a determination.

Processing circuitry 1170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1160 components, such as device readable medium 1180, network node 1160 functionality. For example, processing circuitry 1170 may execute instructions stored in device readable medium 1180 or in memory within processing circuitry 1170. Such functionality may include providing any of the various wireless features, functions, or benefits discussed herein. In some embodiments, processing circuitry 1170 may include a system on a chip (SOC).

In some embodiments, processing circuitry 1170 may include one or more of radio frequency (RF) transceiver circuitry 1172 and baseband processing circuitry 1174. In some embodiments, radio frequency (RF) transceiver circuitry 1172 and baseband processing circuitry 1174 may be on separate chips (or sets of chips), boards, or units, such as radio units and digital units. In alternative embodiments, part or all of RF transceiver circuitry 1172 and baseband processing circuitry 1174 may be on the same chip or set of chips, boards, or units.

In certain embodiments, some or all of the functionality described herein as being provided by a network node, base station, eNB or other such network device may be performed by processing circuitry 1170 executing instructions stored on device readable medium 1180 or memory within processing circuitry 1170. In alternative embodiments, some or all of the functionality may be provided by processing circuitry 1170 without executing instructions stored on a separate or discrete device readable medium, such as in a hard-wired manner. In any of those embodiments, whether executing instructions stored on a device readable storage medium or not, processing circuitry 1170 can be configured to perform the described functionality. The benefits provided by such functionality are not limited to processing circuitry 1170 alone or to other components of network node 1160, but are enjoyed by network node 1160 as a whole, and/or by end users and the wireless network generally.

Device readable medium 1180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1170. Device readable medium 1180 may store any suitable instructions, data or information, including a computer program, software, an application including one or more of logic, rules, code, tables, etc. and/or other instructions capable of being executed by processing circuitry 1170 and, utilized by network node 1160. Device readable medium 1180 may be used to store any calculations made by processing circuitry 1170 and/or any data received via interface 1190. In some embodiments, processing circuitry 1170 and device readable medium 1180 may be considered to be integrated.

Interface 1190 is used in the wired or wireless communication of signaling and/or data between network node 1160, network 1106, and/or WDs 1110. As illustrated, interface 1190 comprises port(s)/terminal(s) 1194 to send and receive data, for example to and from network 1106 over a wired connection. Interface 1190 also includes radio front end circuitry 1192 that may be coupled to, or in certain embodiments a part of, antenna 1162. Radio front end circuitry 1192 comprises filters 1198 and amplifiers 1196. Radio front end circuitry 1192 may be connected to antenna 1162 and processing circuitry 1170. Radio front end circuitry may be configured to condition signals communicated between antenna 1162 and processing circuitry 1170. Radio front end circuitry 1192 may receive digital data that is to be sent out to other network nodes or WDs via a wireless connection. Radio front end circuitry 1192 may convert the digital data into a radio signal having the appropriate channel and bandwidth parameters using a combination of filters 1198 and/or amplifiers 1196. The radio signal may then be transmitted via antenna 1162. Similarly, when receiving data, antenna 1162 may collect radio signals which are then converted into digital data by radio front end circuitry 1192. The digital data may be passed to processing circuitry 1170. In other embodiments, the interface may comprise different components and/or different combinations of components.

In certain alternative embodiments, network node 1160 may not include separate radio front end circuitry 1192, instead, processing circuitry 1170 may comprise radio front end circuitry and may be connected to antenna 1162 without separate radio front end circuitry 1192. Similarly, in some embodiments, all or some of RF transceiver circuitry 1172 may be considered a part of interface 1190. In still other embodiments, interface 1190 may include one or more ports or terminals 1194, radio front end circuitry 1192, and RF transceiver circuitry 1172, as part of a radio unit (not shown), and interface 1190 may communicate with baseband processing circuitry 1174, which is part of a digital unit (not shown).

Antenna 1162 may include one or more antennas, or antenna arrays, configured to send and/or receive wireless signals. Antenna 1162 may be coupled to radio front end circuitry 1190 and may be any type of antenna capable of transmitting and receiving data and/or signals wirelessly. In some embodiments, antenna 1162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1162 may be separate from network node 1160 and may be connectable to network node 1160 through an interface or port.

Antenna 1162, interface 1190, and/or processing circuitry 1170 may be configured to perform any receiving operations and/or certain obtaining operations described herein as being performed by a network node. Any information, data and/or signals may be received from a wireless device, another network node and/or any other network equipment. Similarly, antenna 1162, interface 1190, and/or processing circuitry 1170 may be configured to perform any transmitting operations described herein as being performed by a network node. Any information, data and/or signals may be transmitted to a wireless device, another network node and/or any other network equipment.

Power circuitry 1187 may comprise, or be coupled to, power management circuitry and is configured to supply the components of network node 1160 with power for performing the functionality described herein. Power circuitry 1187 may receive power from power source 1186. Power source 1186 and/or power circuitry 1187 may be configured to provide power to the various components of network node 1160 in a form suitable for the respective components (e.g., at a voltage and current level needed for each respective component). Power source 1186 may either be included in, or external to, power circuitry 1187 and/or network node 1160. For example, network node 1160 may be connectable to an external power source (e.g., an electricity outlet) via an input circuitry or interface such as an electrical cable, whereby the external power source supplies power to power circuitry 1187. As a further example, power source 1186 may comprise a source of power in the form of a battery or battery pack which is connected to, or integrated in, power circuitry 1187. The battery may provide backup power should the external power source fail. Other types of power sources, such as photovoltaic devices, may also be used.

Alternative embodiments of network node 1160 may include additional components beyond those shown in FIG. 16 that may be responsible for providing certain aspects of the network node's functionality, including any of the functionality described herein and/or any functionality necessary to support the subject matter described herein. For example, network node 1160 may include user interface equipment to allow input of information into network node 1160 and to allow output of information from network node 1160. This may allow a user to perform diagnostic, maintenance, repair, and other administrative functions for network node 1160. As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1110 includes antenna 1111, interface 1114, processing circuitry 1120, device readable medium 1130, user interface equipment 1132, auxiliary equipment 1134, power source 1136 and power circuitry 1137. WD 1110 may include multiple sets of one or more of the illustrated components for different wireless technologies supported by WD 1110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1110.

Antenna 1111 may include one or more antennas or antenna arrays, configured to send and/or receive wireless signals, and is connected to interface 1114. In certain alternative embodiments, antenna 1111 may be separate from WD 1110 and be connectable to WD 1110 through an interface or port. Antenna 1111, interface 1114, and/or processing circuitry 1120 may be configured to perform any receiving or transmitting operations described herein as being performed by a WD. Any information, data and/or signals may be received from a network node and/or another WD. In some embodiments, radio front end circuitry and/or antenna 1111 may be considered an interface.

As illustrated, interface 1114 comprises radio front end circuitry 1112 and antenna 1111. Radio front end circuitry 1112 comprise one or more filters 1118 and amplifiers 1116. Radio front end circuitry 1114 is connected to antenna 1111 and processing circuitry 1120, and is configured to condition signals communicated between antenna 1111 and processing circuitry 1120. Radio front end circuitry 1112 may be coupled to or a part of antenna 1111. In some embodiments, WD 1110 may not include separate radio front end circuitry 1112; rather, processing circuitry 1120 may comprise radio front end circuitry and may be connected to antenna 1111. Similarly, in some embodiments, some or all of RF transceiver circuitry 1122 may be considered a part of interface 1114. Radio front end circuitry 1112 may receive digital data that is to be sent out to other network nodes or WDs via a wireless connection. Radio front end circuitry 1112 may convert the digital data into a radio signal having the appropriate channel and bandwidth parameters using a combination of filters 1118 and/or amplifiers 1116. The radio signal may then be transmitted via antenna 1111. Similarly, when receiving data, antenna 1111 may collect radio signals which are then converted into digital data by radio front end circuitry 1112. The digital data may be passed to processing circuitry 1120. In other embodiments, the interface may comprise different components and/or different combinations of components.

Processing circuitry 1120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1110 components, such as device readable medium 1130, WD 1110 functionality. Such functionality may include providing any of the various wireless features or benefits discussed herein. For example, processing circuitry 1120 may execute instructions stored in device readable medium 1130 or in memory within processing circuitry 1120 to provide the functionality disclosed herein.

As illustrated, processing circuitry 1120 includes one or more of RF transceiver circuitry 1122, baseband processing circuitry 1124, and application processing circuitry 1126. In other embodiments, the processing circuitry may comprise different components and/or different combinations of components. In certain embodiments processing circuitry 1120 of WD 1110 may comprise a SOC. In some embodiments, RF transceiver circuitry 1122, baseband processing circuitry 1124, and application processing circuitry 1126 may be on separate chips or sets of chips. In alternative embodiments, part or all of baseband processing circuitry 1124 and application processing circuitry 1126 may be combined into one chip or set of chips, and RF transceiver circuitry 1122 may be on a separate chip or set of chips. In still alternative embodiments, part or all of RF transceiver circuitry 1122 and baseband processing circuitry 1124 may be on the same chip or set of chips, and application processing circuitry 1126 may be on a separate chip or set of chips. In yet other alternative embodiments, part or all of RF transceiver circuitry 1122, baseband processing circuitry 1124, and application processing circuitry 1126 may be combined in the same chip or set of chips. In some embodiments, RF transceiver circuitry 1122 may be a part of interface 1114. RF transceiver circuitry 1122 may condition RF signals for processing circuitry 1120.

In certain embodiments, some or all of the functionality described herein as being performed by a WD may be provided by processing circuitry 1120 executing instructions stored on device readable medium 1130, which in certain embodiments may be a computer-readable storage medium. In alternative embodiments, some or all of the functionality may be provided by processing circuitry 1120 without executing instructions stored on a separate or discrete device readable storage medium, such as in a hard-wired manner. In any of those particular embodiments, whether executing instructions stored on a device readable storage medium or not, processing circuitry 1120 can be configured to perform the described functionality. The benefits provided by such functionality are not limited to processing circuitry 1120 alone or to other components of WD 1110, but are enjoyed by WD 1110 as a whole, and/or by end users and the wireless network generally.

Processing circuitry 1120 may be configured to perform any determining, calculating, or similar operations (e.g., certain obtaining operations) described herein as being performed by a WD. These operations, as performed by processing circuitry 1120, may include processing information obtained by processing circuitry 1120 by, for example, converting the obtained information into other information, comparing the obtained information or converted information to information stored by WD 1110, and/or performing one or more operations based on the obtained information or converted information, and as a result of said processing making a determination.

Device readable medium 1130 may be operable to store a computer program, software, an application including one or more of logic, rules, code, tables, etc. and/or other instructions capable of being executed by processing circuitry 1120. Device readable medium 1130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1120. In some embodiments, processing circuitry 1120 and device readable medium 1130 may be considered to be integrated.

User interface equipment 1132 may provide components that allow for a human user to interact with WD 1110. Such interaction may be of many forms, such as visual, audial, tactile, etc. User interface equipment 1132 may be operable to produce output to the user and to allow the user to provide input to WD 1110. The type of interaction may vary depending on the type of user interface equipment 1132 installed in WD 1110. For example, if WD 1110 is a smart phone, the interaction may be via a touch screen; if WD 1110 is a smart meter, the interaction may be through a screen that provides usage (e.g., the number of gallons used) or a speaker that provides an audible alert (e.g., if smoke is detected). User interface equipment 1132 may include input interfaces, devices and circuits, and output interfaces, devices and circuits. User interface equipment 1132 is configured to allow input of information into WD 1110, and is connected to processing circuitry 1120 to allow processing circuitry 1120 to process the input information. User interface equipment 1132 may include, for example, a microphone, a proximity or other sensor, keys/buttons, a touch display, one or more cameras, a USB port, or other input circuitry. User interface equipment 1132 is also configured to allow output of information from WD 1110, and to allow processing circuitry 1120 to output information from WD 1110. User interface equipment 1132 may include, for example, a speaker, a display, vibrating circuitry, a USB port, a headphone interface, or other output circuitry. Using one or more input and output interfaces, devices, and circuits, of user interface equipment 1132, WD 1110 may communicate with end users and/or the wireless network, and allow them to benefit from the functionality described herein.

Auxiliary equipment 1134 is operable to provide more specific functionality which may not be generally performed by WDs. This may comprise specialized sensors for doing measurements for various purposes, interfaces for additional types of communication such as wired communications etc. The inclusion and type of components of auxiliary equipment 1134 may vary depending on the embodiment and/or scenario.

Power source 1136 may, in some embodiments, be in the form of a battery or battery pack. Other types of power sources, such as an external power source (e.g., an electricity outlet), photovoltaic devices or power cells, may also be used. WD 1110 may further comprise power circuitry 1137 for delivering power from power source 1136 to the various parts of WD 1110 which need power from power source 1136 to carry out any functionality described or indicated herein. Power circuitry 1137 may in certain embodiments comprise power management circuitry. Power circuitry 1137 may additionally or alternatively be operable to receive power from an external power source; in which case WD 1110 may be connectable to the external power source (such as an electricity outlet) via input circuitry or an interface such as an electrical power cable. Power circuitry 1137 may also in certain embodiments be operable to deliver power from an external power source to power source 1136. This may be, for example, for the charging of power source 1136. Power circuitry 1137 may perform any formatting, converting, or other modification to the power from power source 1136 to make the power suitable for the respective components of WD 1110 to which power is supplied.

Figure 17:
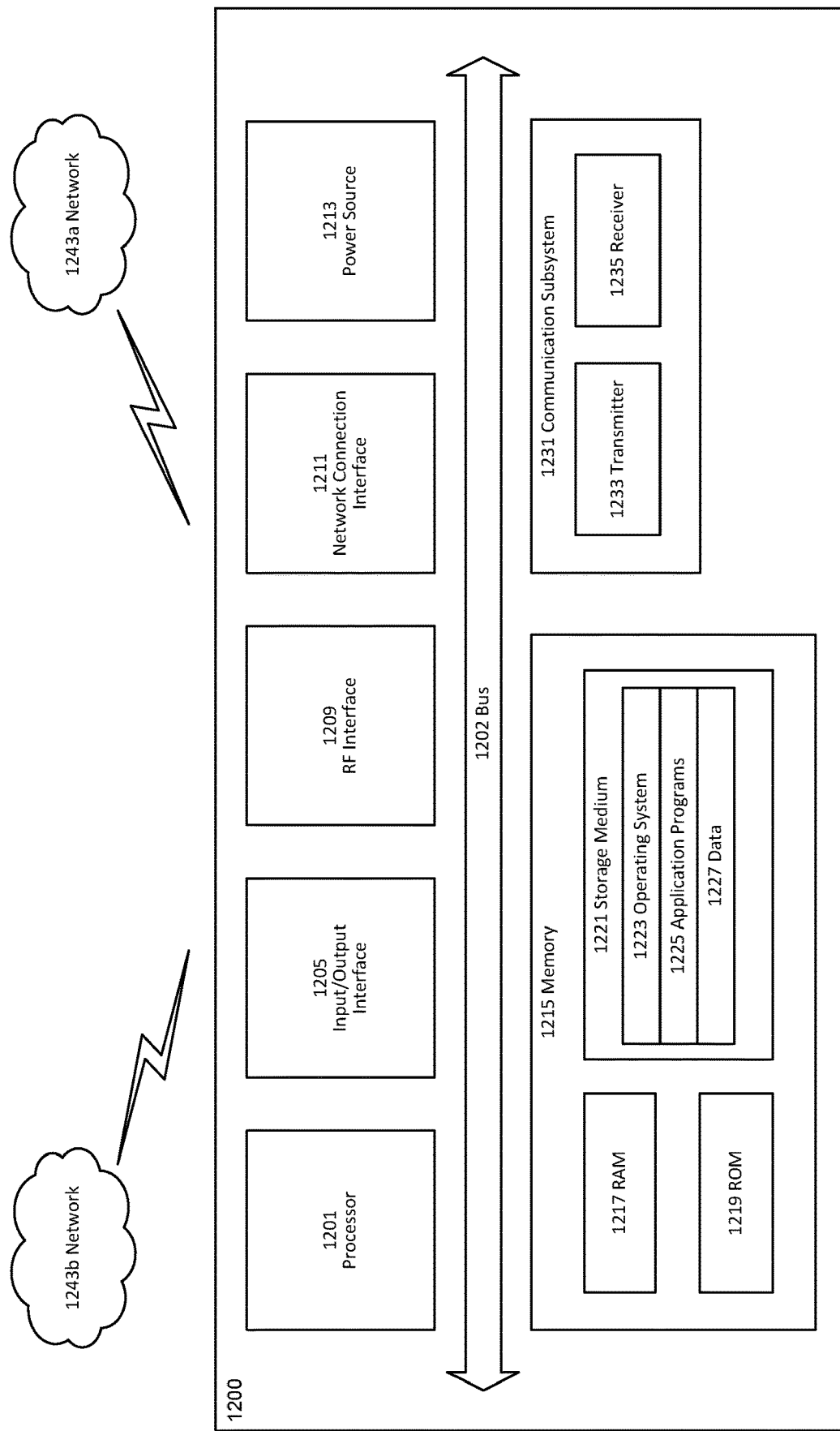
FIG. 17 illustrates an exemplary UE according to an embodiment.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1200 may be any UE identified by the 3rd Generation Partnership Project (3GPP), including a NB-IoT UE, a machine type communication (MTC) UE, and/or an enhanced MTC (eMTC) UE. UE 1200, as illustrated in FIG. 17, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 1200 includes processing circuitry 1201 that is operatively coupled to input/output interface 1205, radio frequency (RF) interface 1209, network connection interface 1211, memory 1215 including random access memory (RAM) 1217, read-only memory (ROM) 1219, and storage medium 1221 or the like, communication subsystem 1231, power source 1233, and/or any other component, or any combination thereof. Storage medium 1221 includes operating system 1223, application program 1225, and data 1227. In other embodiments, storage medium 1221 may include other similar types of information. Certain UEs may utilize all of the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 1201 may be configured to process computer instructions and data. Processing circuitry 1201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1201 may include two central processing units (CPUs). Data may be information in a form suitable for use by a computer.

In the depicted embodiment, input/output interface 1205 may be configured to provide a communication interface to an input device, output device, or input and output device. UE 1200 may be configured to use an output device via input/output interface 1205. An output device may use the same type of interface port as an input device. For example, a USB port may be used to provide input to and output from UE 1200. The output device may be a speaker, a sound card, a video card, a display, a monitor, a printer, an actuator, an emitter, a smartcard, another output device, or any combination thereof. UE 1200 may be configured to use an input device via input/output interface 1205 to allow a user to capture information into UE 1200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 1209 may be configured to provide a communication interface to RF components such as a transmitter, a receiver, and an antenna. Network connection interface 1211 may be configured to provide a communication interface to network 1243*a*. Network 1243*a* may encompass wired and/or wireless networks such as a local-area network (LAN), a wide-area network (WAN), a computer network, a wireless network, a telecommunications network, another like network or any combination thereof. For example, network 1243*a* may comprise a Wi-Fi network. Network connection interface 1211 may be configured to include a receiver and a transmitter interface used to communicate with one or more other devices over a communication network according to one or more communication protocols, such as Ethernet, TCP/IP, SONET, ATM, or the like. Network connection interface 1211 may implement receiver and transmitter functionality appropriate to the communication network links (e.g., optical, electrical, and the like). The transmitter and receiver functions may share circuit components, software or firmware, or alternatively may be implemented separately.

RAM 1217 may be configured to interface via bus 1202 to processing circuitry 1201 to provide storage or caching of data or computer instructions during the execution of software programs such as the operating system, application programs, and device drivers. ROM 1219 may be configured to provide computer instructions or data to processing circuitry 1201. For example, ROM 1219 may be configured to store invariant low-level system code or data for basic system functions such as basic input and output (I/O), startup, or reception of keystrokes from a keyboard that are stored in a non-volatile memory. Storage medium 1221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1221 may be configured to include operating system 1223, application program 1225 such as a web browser application, a widget or gadget engine or another application, and data file 1227. Storage medium 1221 may store, for use by UE 1200, any of a variety of various operating systems or combinations of operating systems.

Storage medium 1221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1221 may allow UE 1200 to access computer-executable instructions, application programs or the like, stored on transitory or non-transitory memory media, to off-load data, or to upload data. An article of manufacture, such as one utilizing a communication system may be tangibly embodied in storage medium 1221, which may comprise a device readable medium.

In FIG. 17, processing circuitry 1201 may be configured to communicate with network 1243b using communication subsystem 1231. Network 1243a and network 1243b may be the same network or networks or different network or networks. Communication subsystem 1231 may be configured to include one or more transceivers used to communicate with network 1243b. For example, communication subsystem 1231 may be configured to include one or more transceivers used to communicate with one or more remote transceivers of another device capable of wireless communication such as another WD, UE, or base station of a radio access network (RAN) according to one or more communication protocols, such as IEEE 802.12, CDMA, WCDMA, GSM, LTE, UTRAN, WiMax, or the like. Each transceiver may include transmitter 1233 and/or receiver 1235 to implement transmitter or receiver functionality, respectively, appropriate to the RAN links (e.g., frequency allocations and the like). Further, transmitter 1233 and receiver 1235 of each transceiver may share circuit components, software or firmware, or alternatively may be implemented separately.

In the illustrated embodiment, the communication functions of communication subsystem 1231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1231 may include cellular communication, Wi-Fi communication, Bluetooth communication, and GPS communication. Network 1243b may encompass wired and/or wireless networks such as a local-area network (LAN), a wide-area network (WAN), a computer network, a wireless network, a telecommunications network, another like network or any combination thereof. For example, network 1243b may be a cellular network, a Wi-Fi network, and/or a near-field network. Power source 1213 may be configured to provide alternating current (AC) or direct current (DC) power to components of UE 1200.

The features, benefits and/or functions described herein may be implemented in one of the components of UE 1200 or partitioned across multiple components of UE 1200. Further, the features, benefits, and/or functions described herein may be implemented in any combination of hardware, software or firmware. In one example, communication subsystem 1231 may be configured to include any of the components described herein. Further, processing circuitry 1201 may be configured to communicate with any of such components over bus 1202. In another example, any of such components may be represented by program instructions stored in memory that when executed by processing circuitry 1201 perform the corresponding functions described herein. In another example, the functionality of any of such components may be partitioned between processing circuitry 1201 and communication subsystem 1231. In another example, the non-computationally intensive functions of any of such components may be implemented in software or firmware and the computationally intensive functions may be implemented in hardware.

Figure 18:
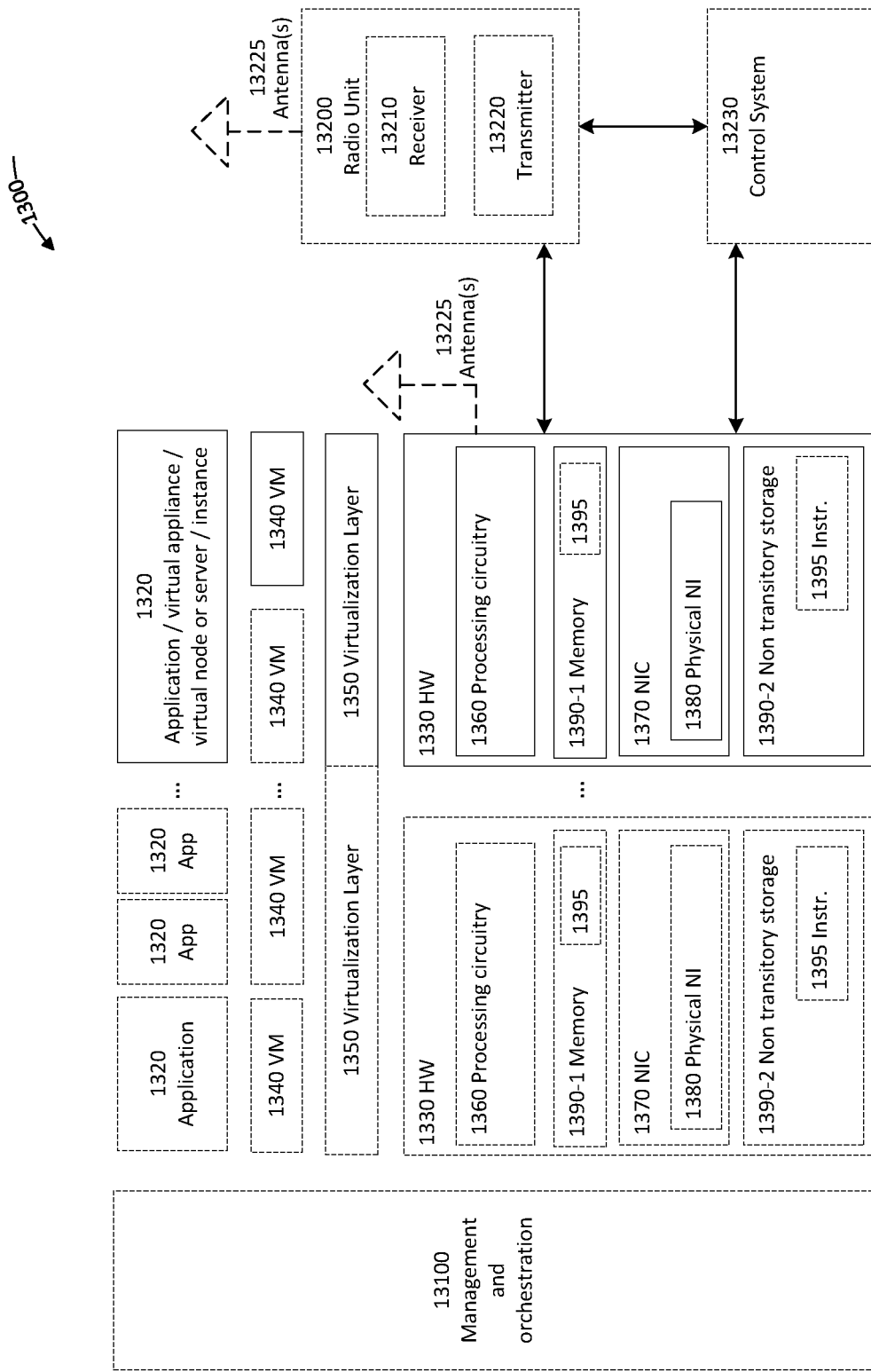
FIG. 18 illustrates an exemplary virtualization environment according to an embodiment.

FIG. 18 is a schematic block diagram illustrating a virtualization environment 1300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1300 hosted by one or more of hardware nodes 1330. Further, in embodiments in which the virtual node is not a radio access node or does not require radio connectivity (e.g., a core network node), then the network node may be entirely virtualized.

The functions may be implemented by one or more applications 1320 (which may alternatively be called software instances, virtual appliances, network functions, virtual nodes, virtual network functions, etc.) operative to implement some of the features, functions, and/or benefits of some of the embodiments disclosed herein. Applications 1320 are run in virtualization environment 1300 which provides hardware 1330 comprising processing circuitry 1360 and memory 1390. Memory 1390 contains instructions 1395 executable by processing circuitry 1360 whereby application 1320 is operative to provide one or more of the features, benefits, and/or functions disclosed herein.

Virtualization environment 1300, comprises general-purpose or special-purpose network hardware devices 1330 comprising a set of one or more processors or processing circuitry 1360, which may be commercial off-the-shelf (COTS) processors, dedicated Application Specific Integrated Circuits (ASICs), or any other type of processing circuitry including digital or analog hardware components or special purpose processors. Each hardware device may comprise memory 1390-1 which may be non-persistent memory for temporarily storing instructions 1395 or software executed by processing circuitry 1360. Each hardware device may comprise one or more network interface controllers (NICs) 1370, also known as network interface cards, which include physical network interface 1380. Each hardware device may also include non-transitory, persistent, machine-readable storage media 1390-2 having stored therein software 1395 and/or instructions executable by processing circuitry 1360. Software 1395 may include any type of software including software for instantiating one or more virtualization layers 1350 (also referred to as hypervisors), software to execute virtual machines 1340 as well as software allowing it to execute functions, features and/or benefits described in relation with some embodiments described herein.

Virtual machines 1340, comprise virtual processing, virtual memory, virtual networking or interface and virtual storage, and may be run by a corresponding virtualization layer 1350 or hypervisor. Different embodiments of the instance of virtual appliance 1320 may be implemented on one or more of virtual machines 1340, and the implementations may be made in different ways.

During operation, processing circuitry 1360 executes software 1395 to instantiate the hypervisor or virtualization layer 1350, which may sometimes be referred to as a virtual machine monitor (VMM). Virtualization layer 1350 may present a virtual operating platform that appears like networking hardware to virtual machine 1340.

As shown in FIG. 18, hardware 1330 may be a standalone network node with generic or specific components. Hardware 1330 may comprise antenna 13225 and may implement some functions via virtualization. Alternatively, hardware 1330 may be part of a larger cluster of hardware (e.g., such as in a data center or customer premise equipment (CPE)) where many hardware nodes work together and are managed via management and orchestration (MANO) 13100, which, among others, oversees lifecycle management of applications 1320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1340 may be a software implementation of a physical machine that runs programs as if they were executing on a physical, non-virtualized machine. Each of virtual machines 1340, and that part of hardware 1330 that executes that virtual machine, be it hardware dedicated to that virtual machine and/or hardware shared by that virtual machine with others of the virtual machines 1340, forms a separate virtual network elements (VNE).

Still in the context of NFV, Virtual Network Function (VNF) is responsible for handling specific network functions that run in one or more virtual machines 1340 on top of hardware networking infrastructure 1330 and corresponds to application 1320 in FIG. 18.

In some embodiments, one or more radio units 13200 that each include one or more transmitters 13220 and one or more receivers 13210 may be coupled to one or more antennas 13225. Radio units 13200 may communicate directly with hardware nodes 1330 via one or more appropriate network interfaces and may be used in combination with the virtual components to provide a virtual node with radio capabilities, such as a radio access node or a base station.

In some embodiments, some signaling can be affected with the use of control system 13230 which may alternatively be used for communication between the hardware nodes 1330 and radio units 13200.

Figure 19:
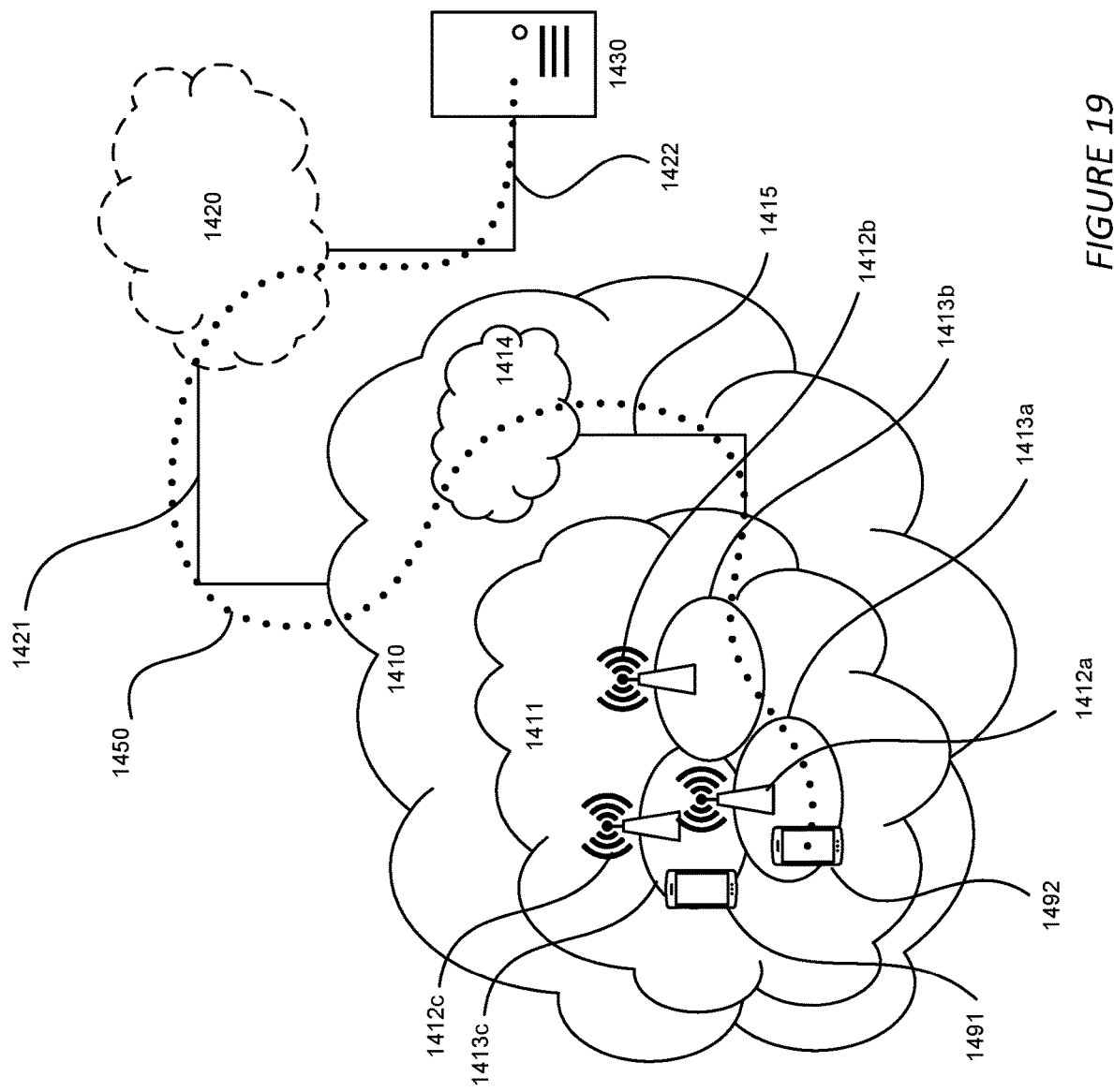
FIG. 19 illustrates an exemplary telecommunication network connected via an intermediate network to a host computer according to an embodiment.

FIG. 19 illustrates a telecommunication network connected via an intermediate network to a host computer in accordance with some embodiments. In particular, with reference to FIG. 19, in accordance with an embodiment, a communication system includes telecommunication network 1410, such as a 3GPP-type cellular network, which comprises access network 1411, such as a radio access network, and core network 1414. Access network 1411 comprises a plurality of base stations 1412a, 1412b, 1412c, such as NBs, eNBs, gNBs or other types of wireless access points, each defining a corresponding coverage area 1413a, 1413b, 1413c. Each base station 1412a, 1412b, 1412c is connectable to core network 1414 over a wired or wireless connection 1415. A first UE 1491 located in coverage area 1413c is configured to wirelessly connect to, or be paged by, the corresponding base station 1412c. A second UE 1492 in coverage area 1413a is wirelessly connectable to the corresponding base station 1412a. While a plurality of UEs 1491, 1492 are illustrated in this example, the disclosed embodiments are equally applicable to a situation where a sole UE is in the coverage area or where a sole UE is connecting to the corresponding base station 1412.

Telecommunication network 1410 is itself connected to host computer 1430, which may be embodied in the hardware and/or software of a standalone server, a cloud-implemented server, and a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks (not shown).

The communication system of FIG. 19 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

Figure 20:
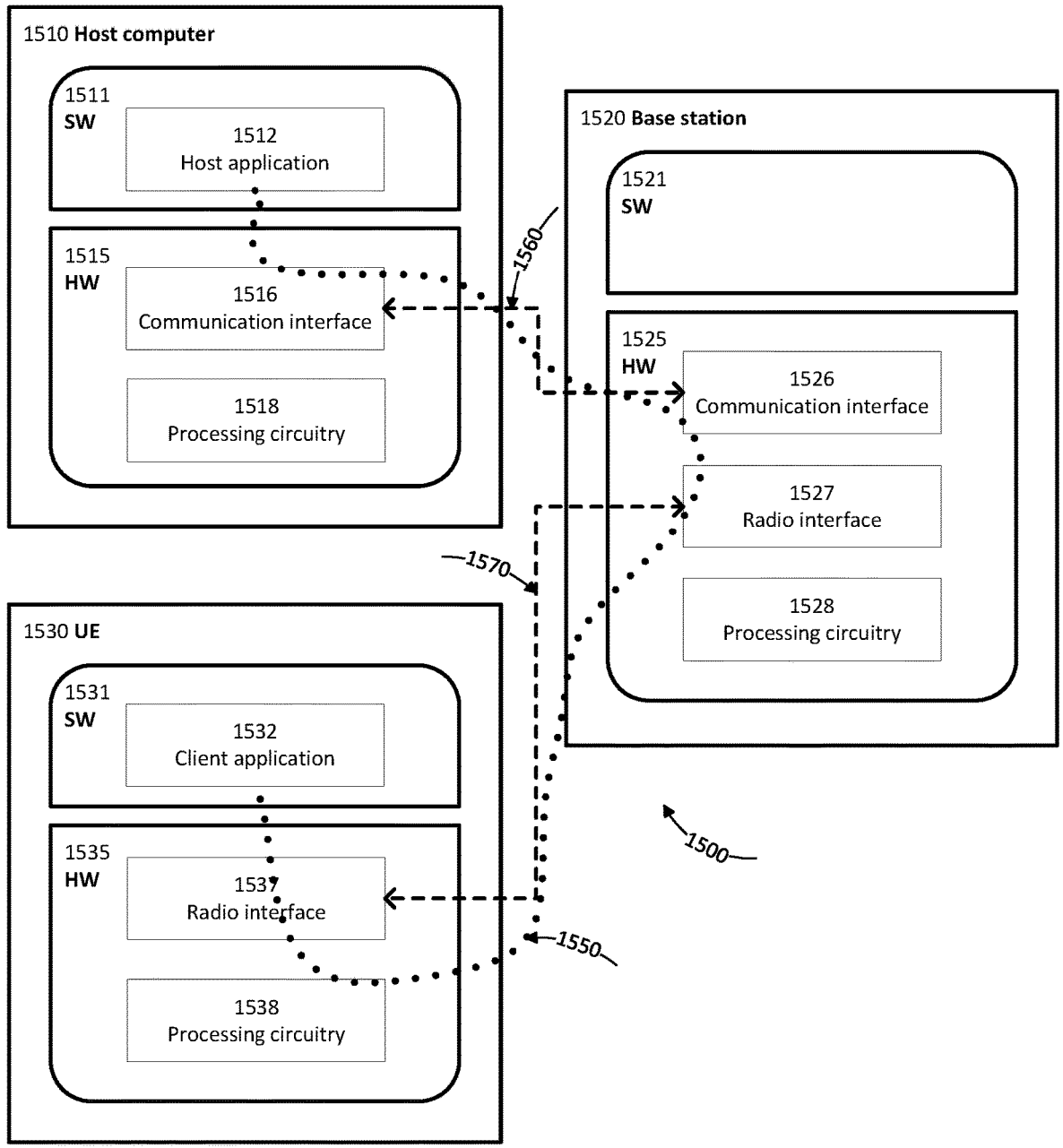
FIG. 20 illustrates an exemplary host computer communicating via a base station with a user equipment over a partially wireless connection according to an embodiment.

Example implementations, in accordance with an embodiment, of the UE, base station and host computer discussed in the preceding paragraphs will now be described with reference to FIG. 20. FIG. 20 illustrates host computer communicating via a base station with a user equipment over a partially wireless connection in accordance with some embodiments In communication system 1500, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with UE 1530 located in a coverage area (not shown in FIG. 20) served by base station 1520. Communication interface 1526 may be configured to facilitate connection 1560 to host computer 1510. Connection 1560 may be direct or it may pass through a core network (not shown in FIG. 20) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 20 may be similar or identical to host computer 1430, one of base stations 1412*a*, 1412*b*, 1412*c* and one of UEs 1491, 1492 of FIG. 19, respectively. This is to say, the inner workings of these entities may be as shown in FIG. 20 and independently, the surrounding network topology may be that of FIG. 19.

In FIG. 20, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may reduce power consumption in MTC devices and thereby provide benefits such as longer service life for MTC devices without replacement or change of batteries.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors (not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

Figure 21:
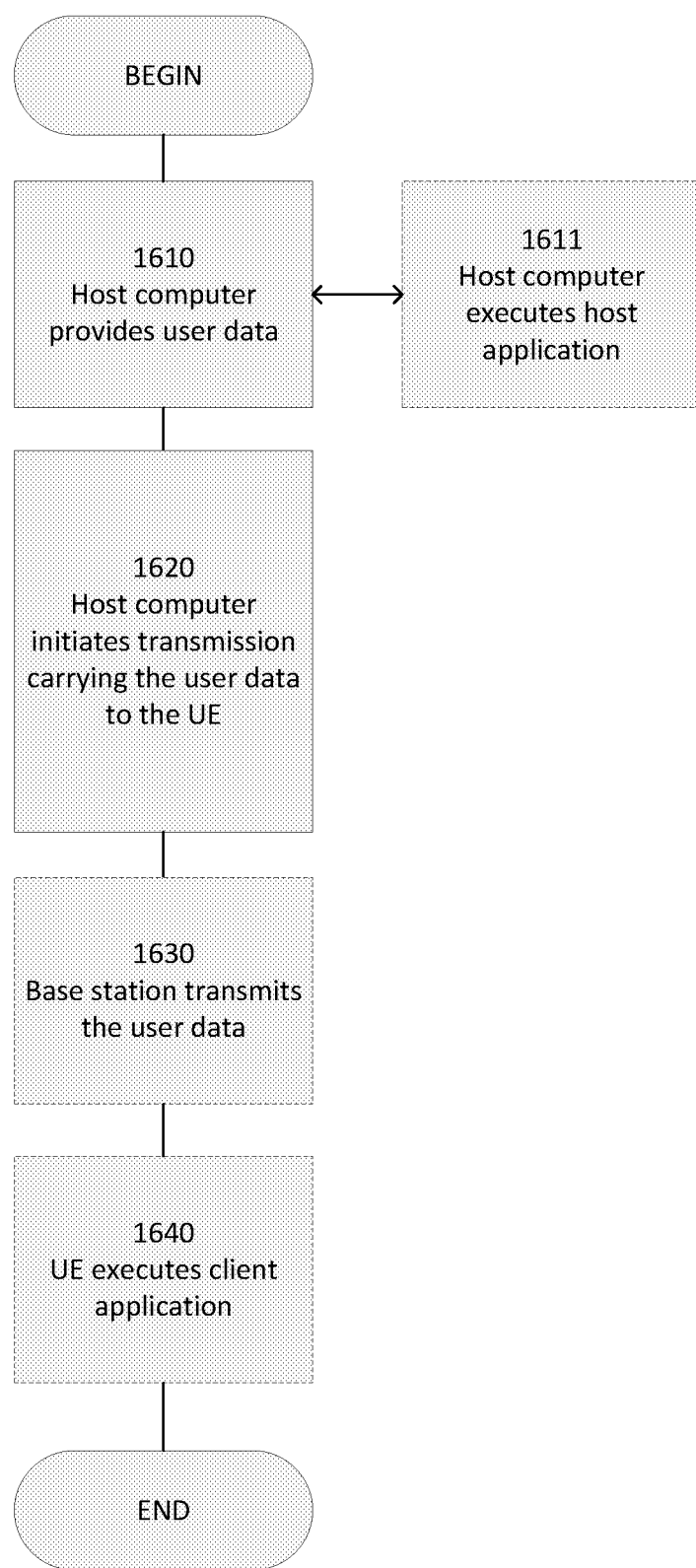
FIGS. 21-24 illustrate exemplary methods implemented in a communication system, according to an embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

Figure 22:
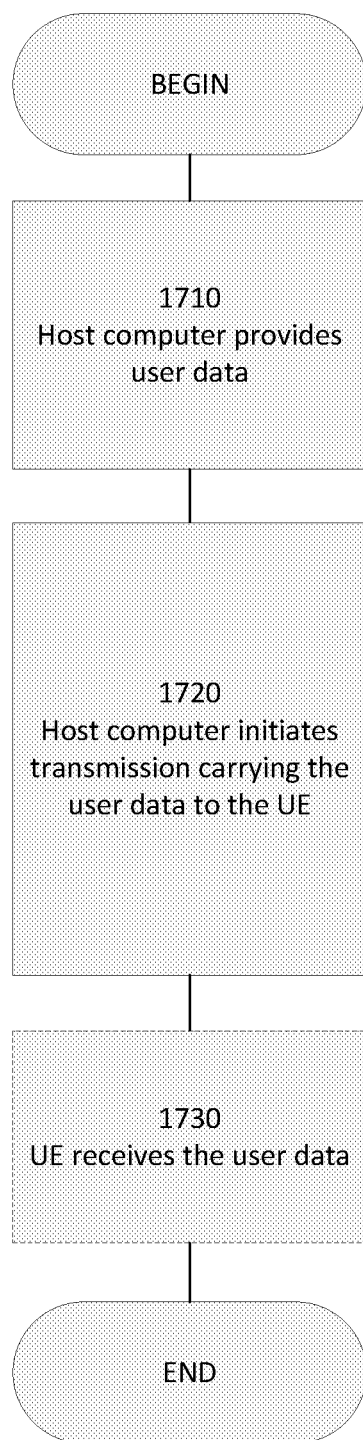

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figure 23:
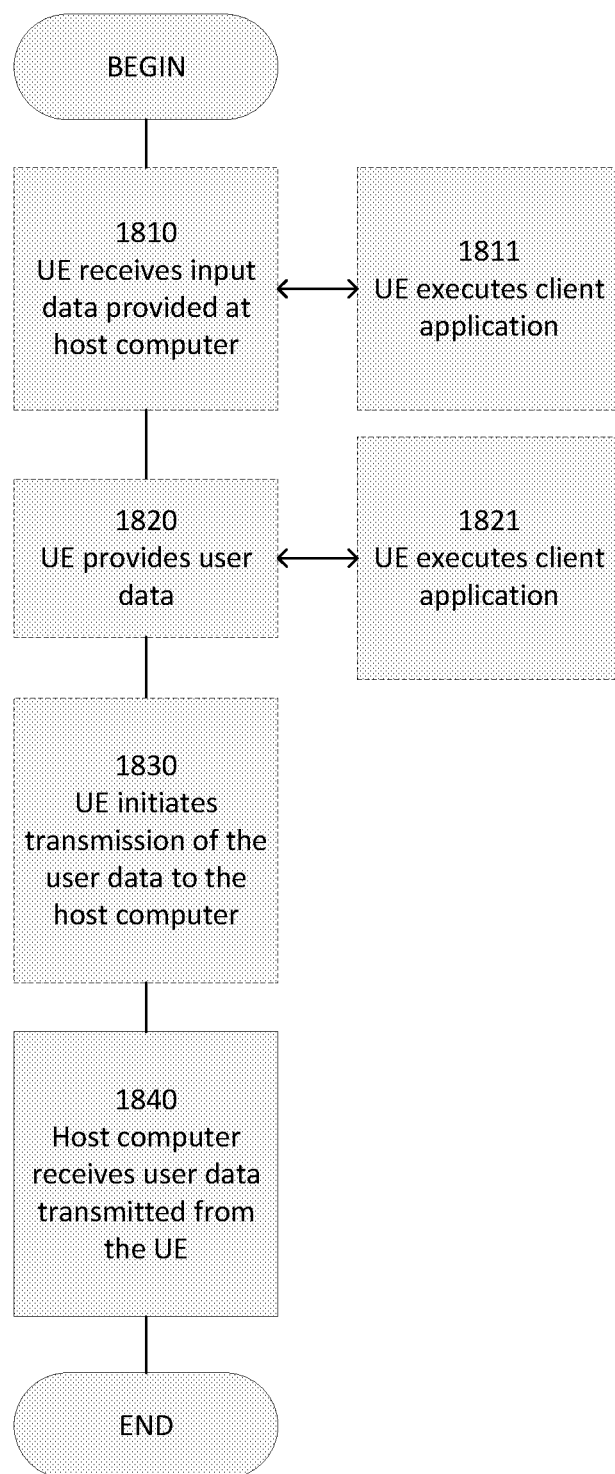

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

Figure 24:
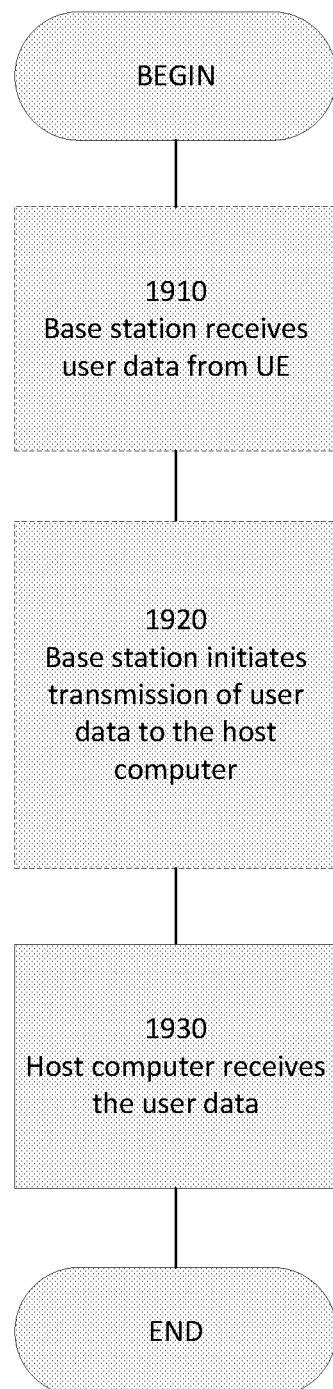

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method of battery state monitoring implemented by a network node in a wireless communication network, the method comprising:
   determining a user equipment (UE) type of a UE;
   determining a model designation associated with a battery used by the UE based on the UE type;
   determining a voltage response characteristic of the battery based on the model designation associated with the battery;
   generating, based on the voltage response characteristic of the battery, a predictive model for predicting a state of the battery;
   determining an activity pattern of the UE;
   estimating a predicted life-time of the battery based on the predictive model and the activity pattern of the UE; and
   controlling operation of the UE to extend the predicted life-time of the battery,
   wherein the voltage response characteristic is temperature dependent, and wherein controlling the operation of the UE comprises barring access by the UE to the wireless communication network during a predetermined time period based on the voltage response characteristic of the battery and a temperature associated with the UE.

2. The method of claim 1 wherein determining the UE type comprises receiving an indication of the UE type from (i) the UE in information transmitted by the UE, or (ii) a network node in the wireless communication network.

3. The method of claim 1 wherein the voltage response characteristic comprises at least one of a sustained current load of the battery, a recovery period of the battery, or a discharge duration of the battery.

4. The method of claim 1 further comprising:
determining a temperature at a location of the UE during one or more time periods;
wherein the estimation of the predicted life-time of the battery is further based on the temperature at the location of the UE during the one or more time periods.

5. The method of claim 4 wherein the temperature comprises at least one of an average daytime temperature and an average nighttime temperature.

6. The method of claim 1 wherein controlling the operation of the UE further comprises controlling a communication procedure of the UE to extend the predicted life-time of the battery.

7. The method of claim 6 wherein controlling the communication procedure of the UE to extend the predicted life-time of the battery comprises controlling one or more of:
(a) data transmission by the UE dependent on the voltage response characteristic of the battery;
(b) data reception by the UE dependent on the voltage response characteristic of the battery;
(c) a search procedure used by the UE dependent on the voltage response characteristic of the battery;
(d) retransmission by the UE dependent on the voltage response characteristic of the battery; and
(e) a discontinuous reception mode or a power saving mode of the UE.

8. A network node in a wireless communication network configured to perform battery state monitoring for a user equipment (UE), the network node comprising:
an interface circuit configured to communicate with the UE over a wireless communication channel; and
a processing circuit operatively coupled to the interface circuit, the processing circuit being configured to:
determine a user equipment (UE) type of a UE;
determine a model designation associated with a battery used by the UE based on the UE type;
determine a voltage response characteristic of the battery based on the model designation associated with the battery;
generate, based on the voltage response characteristic of the battery, a predictive model for predicting a state of the battery;
determine an activity pattern of the UE;
estimate a predicted life-time of the battery based on the predictive model and the activity pattern of the UE; and
control operation of the UE to extend the predicted life-time of the battery,
wherein the voltage response characteristic is temperature dependent, and
wherein controlling the operation of the UE comprises barring access by the UE to the wireless communication network during a predetermined time period based on the voltage response characteristic of the battery and a temperature associated with the UE.

9. The network node of claim 8, wherein the processing circuit is further configured to determine the UE type by receiving an indication of the UE type from (i) the UE in information transmitted by the UE, or (ii) a network node in the wireless communication network.

10. The network node of claim 8 wherein the voltage response characteristic comprises at least one of a sustained current load of the battery, a recovery period of the battery, or a discharge duration of the battery.

11. The network node of claim 8, wherein the processing circuit is further configured to determine a temperature at a location of the UE during one or more time periods;
wherein the estimation of the predicted life-time of the battery is further based on the temperature at the location of the UE during the one or more time periods.

12. The network node of claim 11 wherein the temperature comprises at least one of an average daytime temperature and an average nighttime temperature.

13. The network node of claim 8 wherein controlling the operation of the UE further comprises controlling a communication procedure of the UE to extend the predicted life-time of the battery.

14. The network node of claim 13 wherein controlling the communication procedure of the UE to extend the predicted life-time of the battery comprises controlling one or more of:
(a) data transmission by the UE dependent on the voltage response characteristic of the battery;
(b) data reception by the UE dependent on the voltage response characteristic of the battery;
(c) a search procedure used by the UE dependent on the voltage response characteristic of the battery;
(d) retransmission by the UE dependent on the voltage response characteristic of the battery; and
(e) a discontinuous reception mode or a power saving mode of the UE.

* * * * *